US012582208B2

(12) United States Patent
Shami

(10) Patent No.: US 12,582,208 B2
(45) Date of Patent: Mar. 24, 2026

(54) LAVA ROCK CONTAINING HAIR STYLING DEVICES

(71) Applicant: FAROUK SYSTEMS, INC., Houston, TX (US)

(72) Inventor: Farouk M. Shami, Houston, TX (US)

(73) Assignee: Farouk Systems, Inc., Houston, TX (US)

( * ) Notice: Subject to any disclaimer, the term of this patent is extended or adjusted under 35 U.S.C. 154(b) by 0 days.

(21) Appl. No.: 17/984,932

(22) Filed: Nov. 10, 2022

(65) Prior Publication Data

US 2023/0084188 A1 Mar. 16, 2023

Related U.S. Application Data

(63) Continuation of application No. 16/446,435, filed on Jun. 19, 2019, now Pat. No. 11,528,980, which is a continuation-in-part of application No. 15/774,840, filed as application No. PCT/US2017/067997 on Dec. 21, 2017, now Pat. No. 11,096,464.

(51) Int. Cl.

| | |
|---|---|
| ***A45D 20/12*** | (2006.01) |
| ***A45D 1/04*** | (2006.01) |
| ***A45D 20/26*** | (2006.01) |

(52) U.S. Cl.

CPC ............. *A45D 20/122* (2013.01); *A45D 1/04* (2013.01); *A45D 20/26* (2013.01); *H05B 2203/02* (2013.01)

(58) Field of Classification Search

CPC ........ A45D 20/122; A45D 1/04; A45D 20/26; H05B 2203/02

See application file for complete search history.

(56) References Cited

U.S. PATENT DOCUMENTS

| | | | |
|---|---|---|---|
| 1,995,618 | A | 3/1935 | Lakenbach |
| 3,927,300 | A | 12/1975 | Wada et al. |
| 4,316,077 | A | 2/1982 | Carlson |
| 5,105,725 | A | 4/1992 | Haglund |
| 5,761,824 | A | 6/1998 | Moon et al. |

(Continued)

FOREIGN PATENT DOCUMENTS

| | | | |
|---|---|---|---|
| CN | 101084614 | A | 12/2007 |
| CN | 104411203 | A | 3/2015 |

(Continued)

OTHER PUBLICATIONS

PCT Search Report received in co-pending PCT Application No. PCT/US2017/067997, dated Feb. 22, 2018, 15 pages.

(Continued)

*Primary Examiner* — Nicholas D Lucchesi

(74) *Attorney, Agent, or Firm* — Blank Rome LLP

(57) ABSTRACT

Hairstyling devices include one or more heat transmissive elements having a coating disposed thereon, the coating having ceramic and lava rock incorporated therein. The use of lava rock-containing coatings as described herein results in hairstyling devices with heat transmissive elements exhibiting enhanced heat retention, faster heat recovery, and increased ion emission. Furthermore, lava rock-containing coatings have been found more durable than equivalent heat transmissive element coatings that do not have lava rock incorporated therein.

20 Claims, 15 Drawing Sheets

(56) References Cited

U.S. PATENT DOCUMENTS

| | | | | |
|---|---|---|---|---|
| 5,963,709 | A | 10/1999 | Staples et al. | |
| 8,233,784 | B2 | 7/2012 | Zenteno et al. | |
| 8,530,794 | B2 | 9/2013 | Shami et al. | |
| 9,138,038 | B2 | 9/2015 | deGrood et al. | |
| 2005/0056631 | A1 | 3/2005 | Cha | |
| 2006/0027555 | A1 * | 2/2006 | Aisenbrey | H05B 3/146 219/385 |
| 2007/0119844 | A1 | 5/2007 | Lo et al. | |
| 2008/0017074 | A1 | 1/2008 | Park | |
| 2010/0014958 | A1 | 1/2010 | Bluck et al. | |
| 2011/0011846 | A1 * | 1/2011 | Soerensen | H05B 3/26 219/494 |
| 2011/0100391 | A1 * | 5/2011 | Paolacci | A45D 2/001 132/226 |
| 2011/0180527 | A1 | 7/2011 | Abbott | |
| 2011/0226277 | A1 | 9/2011 | Choi | |
| 2012/0111354 | A1 | 5/2012 | Cafaro et al. | |
| 2012/0111357 | A1 | 5/2012 | Amkie | |
| 2012/0291797 | A1 | 11/2012 | Degrood et al. | |
| 2014/0227216 | A1 | 8/2014 | Mac Dermott et al. | |
| 2014/0272347 | A1 * | 9/2014 | Hongladarom | C08L 69/00 428/339 |
| 2015/0122792 | A1 * | 5/2015 | Moore | A45D 1/28 219/222 |
| 2015/0335120 | A1 | 11/2015 | Moore et al. | |
| 2016/0213117 | A1 * | 7/2016 | Keong | A45D 1/28 |
| 2016/0262518 | A1 | 9/2016 | Guy-Rabi et al. | |
| 2016/0360846 | A1 | 12/2016 | Shami | |
| 2018/0170815 | A1 | 6/2018 | Helskens et al. | |
| 2020/0361824 | A1 | 11/2020 | Helskens et al. | |

FOREIGN PATENT DOCUMENTS

| | | | | |
|---|---|---|---|---|
| CN | 206079453 | U | 4/2017 | |
| CN | 207881209 | U | 9/2018 | |
| EP | 2044858 | A1 | 4/2009 | |
| EP | 2204104 | A1 | 7/2010 | |
| EP | 2238855 | A1 | 10/2010 | |
| JP | 3078424 | | 7/2001 | |
| JP | 2004105577 | A | 4/2004 | |
| KR | 20020014112 | A | 2/2002 | |
| KR | 200328335 | Y1 | 9/2003 | |
| KR | 1020050108799 | A | 11/2005 | |
| KR | 20090070306 | A | 7/2009 | |
| KR | 1020170103282 | A | 9/2017 | |
| RU | 2567708 | C2 | 11/2015 | |
| WO | WO-2004091335 | A2 * | 10/2004 | A45D 1/16 |
| WO | 2007058434 | A1 | 5/2007 | |
| WO | 2015028632 | A1 | 3/2015 | |
| WO | 2017031417 | A1 | 2/2017 | |

OTHER PUBLICATIONS

"Chi Man Innovates Again with New Chi Lava 1" Hairstyling Iron," Beauty Launchpad, dated Nov. 30, 2017, 4 pages.

EP Search Report received in co-pending EP Application No. 17868487, dated Sep. 28, 2018, 8 pages.

"Chi Lava Hair Dryer Release" (Bay Area Beauty Blogger) [online] retrieved from <URL:https://bayareabeautyblogger.com/2019/04/15/chi-lava-hair-dryer-release/>, Apr. 15, 2019.

"Overview of Pelonic Technologies' Honeycomb PTC Air Heater Products" (Pelonic Technologies) [online] retrieved from <URL: https://web.archive.org/web/20170801162154/http:/www.pelonistechnologies.com/honeycomb-ptc-air-heaters>, Aug. 1, 2017.

"1 Pcs Automatic Thermostat Ptc Heater With Stand Corrugated Strip Small Space Heating sow 12v (AC/DC) Diy Heating Tools" (Amazon) [online] retrieved from <URL: https://www.amazon.com/Automatic-Thermostat-Heater-Corrugated-Heating/dp/B06Y5JGJYK>, Apr. 9, 2017.

"CHI Lava Spin N Curl" (Chi) [online] retrieved from <URL: https://chi.com/product/chi-lava-spin- n-curl/>, Sep. 25, 2018.

Int'l Search Report received in related PCT Application No. PCT/US19/38040 dated Sep. 5, 2019, 9 pages.

Farouk Systems, Inc. "Beauty Products Perfect for Fall—Features CHI Lava Ceramic Curling Iron." Oct. 3, 2019, CHI Lava, In The Media, Press Releases. 10 pages.

Farouk Systems, Inc. "Chi Launches Volcanic LAVA Ceramic Hair Dryer." Mar. 27, 2019, CHI Lava, In The Media, Press Releases. retrieved from: https://chi.com/chi-launches-volcanic-lava-ceramic-hair-dryer/. 11 pages.

Farouk Systems, Inc. "Farouk Shami Interviewed—CHI Lava Tapered Wand—Innovative High-Tech Tools That Are Changing the Hair Game." Oct. 29, 2018, Dr. Farouk Shami, Press Releases. retrieved from: https://farouk.com/blog/2018/10/29/farouk-interviewd-chi-lava/. 5 pages.

Farouk Systems, Inc. "How-To: Fairytale Festival Looks from the CHI Lava Pro Spin N Curl." Apr. 19, 2018, CHI Lava, CHI Spin N Curl, Trending Now. retrieved from: https://chi.com/how-to-fairytale-looks-from-the-chi-loava-pro-spin-n-curl/. 10 pages.

"Overview of pelonis technologies honeycomb PTC air heater products." http://www.pelonistechnologies.com Jun. 19, 2019.

Generic 1 Pcs PTC 50W 12 V Ac/Dc Heater Automatic Thermostat With Stand Corrugated Strip Small Space Heating Tools; https://www.amazon.in/Generic-Automatic-Thermostat-Corrugated-Heating/dp/B073JJLZ2X (Jun. 30, 2017).

* cited by examiner

LAVA ROCK CONTAINING HAIR STYLING DEVICES

REFERENCE TO RELATED APPLICATIONS

This application is a continuation of U.S. application Ser. No. 16/446,435 filed Jun. 19, 2019, which is a continuation-in-part of U.S. application Ser. No. 15/774,840 filed May 9, 2018, now U.S. Pat. No. 11,096,464, which is a national stage of PCT Application Serial No. PCT/US2017/067997 filed Dec. 21, 2017, each of which are incorporated herein by reference in their entireties.

FIELD OF THE INVENTION

The present invention relates to hair styling devices, especially flat irons, blow dryers and curling irons.

BACKGROUND OF THE INVENTION

Hair styling devices include heating and blowing devices. Of these, hair styling flat irons typically include two handles or arms, pivotably hinged at one end. Each handle includes a gripping portion on the outer side of the handle and extending from the hinged end to a middle portion of the flat iron for gripping by a user. Each handle further includes a heating plate located on the inner side of the handle and extending longitudinally from the middle portion of the handle to or near the end of the handle opposite the hinged end. The heating plates are usually made of a metal, an alloy or a ceramic. Heating plates made of ceramic are preferred as those made of a metal or an alloy are generally less gentle to hair. An electric heating element is located beneath each heating plate is utilized to warm the heating plate to a predetermined temperature which can be set by a digital or analog temperature controller located on one of handles. After the flat iron is heated to a desired or working temperature, the heating plates are positioned above and below strands of hair to be styled and the hinged handles are closed toward each other, bringing the heating plates in contact with the strands of hair. The handles are then moved relative to the strands of hair, so as to run the heating plates along the strands of hair until they exit from between the heating plates.

In hair blowers, hot, warm or ambient temperature air is blown through the air to effect drying and/or styling. Hair blowers can be hand held or stand mounted.

In curling irons, hair is wound, either manually or mechanically, around a cylindrical heating element to heat and curl the hair.

SUMMARY OF THE INVENTION

Hair styling devices are provided herein, including methods of making and using such devices, which are intended to address some of the deficiencies and problems with known hair styling devices.

DETAILED DESCRIPTION

Figure 1:
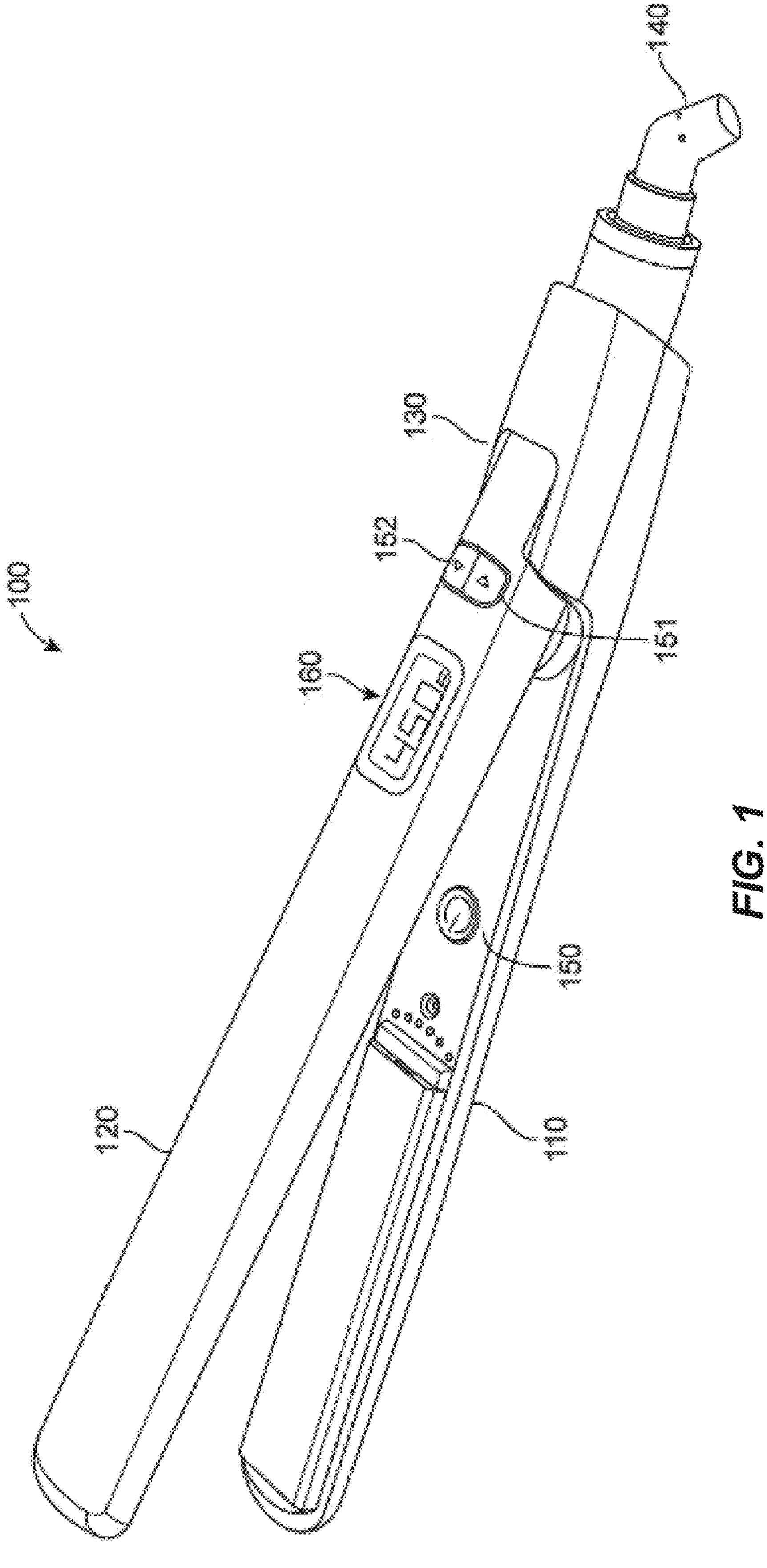
FIG. 1 is a perspective view of a hair styling flat iron in accordance with various aspects of the present disclosure.

Hair styling devices are provided herein having elements comprising a composition having volcanic or lava rock and a ceramic heating element. Further disclosed are methods of making a lava containing heating element for a hair styling device where a heating plate is made in part of volcanic or lava rock and a ceramic. The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

For the purposes of this specification and appended claims, the term "coupled" refers to the linking or connection of two objects. The coupling can be permanent or reversible. The coupling can be direct or indirect. An indirect coupling includes connecting two objects through one or more intermediary objects. The term "substantially" refers to an element essentially conforming to the particular dimension, shape or other word that substantially modifies, such that the component need not be exact. For example, substantially circular means that the object resembles a circle, but can have one or more deviations from a true circle.

The disclosure is directed to hair styling devices including flat irons, curling irons, and hair dryers. Hair styling devices in accordance with various aspects of the present disclosure comprise heat transmissive members coated with a composition comprising volcanic or lava rock. Hair styling devices in accordance with various embodiments of the present disclosure exhibit superior properties in use as compared to similar prior art devices due to the incorporation of volcanic or lava rock into a ceramic-containing layer on exterior surfaces of the heat transmissive members. Specifically, hair styling devices in accordance with various aspects of the preset disclosure have been found to exhibit properties far superior to similar prior art devices such as better heat retention, faster rates of heating before use, and faster rates of reheating during use. Additionally, hair styling devices in accordance with various aspects of the preset disclosure have been found to exhibit increased ion generation when compared to similar prior art devices. Increased ion density of a hair styling device has been found to result in smoother, shinier, and less frizzy hair. Specifically, increased ion density of a hair styling device has been found to result in smoother, shinier, and less frizzy hair. Hair styling devices according to the present disclosure are also operable over a wide temperature range. Specifically, in preferred embodiments, hair styling devices of the present disclosure are operable at temperatures ranging from about 200° F. (~93° C.) to about 450° F. (~232° C.).

Figure 2:
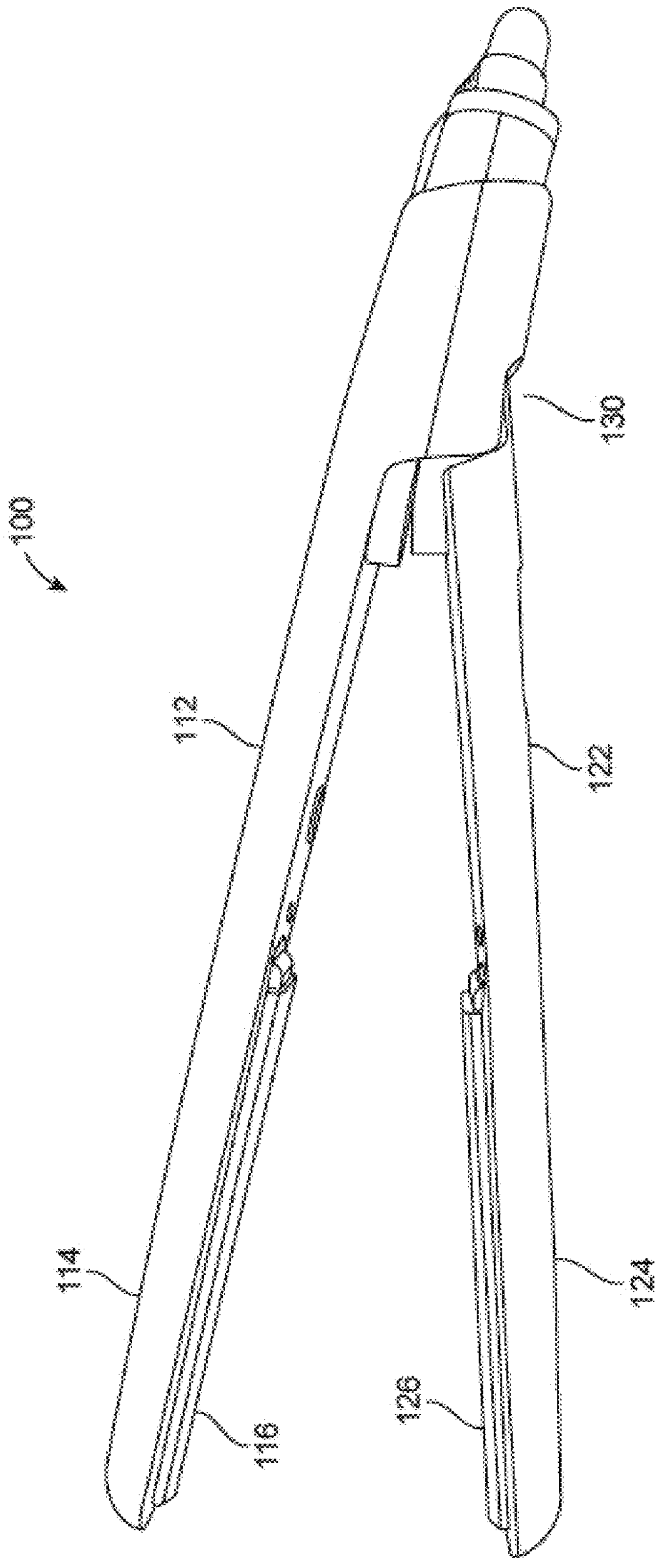
FIG. 2 is a side plan view of the flat iron of FIG. 1 in accordance with various aspects of the present disclosure.

FIG. 1 is a perspective view of a hair styling flat iron in accordance with various aspects of the present disclosure. FIG. 2 a side plan view of the flat iron of FIG. 1 in accordance with various aspects of the present disclosure. The flat iron 100 includes first arm 110, and a second arm 120 coupled with each other via a pivotable hinge 130. In some instances, the pivotable hinge 130 can include a spring assembly to bias the second arm 120 away from the first arm 110 such that the first arm 110 and the second arm 120 are in an open position. In some instances, the flat iron 100 can include a locking element (not shown) to keep the flat iron in a closed position.

Each arm includes a handle portion 112, 122 and a styling portion 114, 124. Each styling portion 114, 124 includes a heating plate 116, 126 located on an interior portion thereof. The heating plates 116, 126 are positioned on opposed interior surfaces of the first arm 110 and the second arm 120, such that the heating plates 116, 126 are generally aligned and abut when the first arm 110 and the second arm 120 are in a closed position. Electricity, in the form of alternating or direct current, may be provided to the flat iron 100 via an electrical cord 140 from a conventional external electricity source, where the electrical cord 140 is electrically couplable with the external electricity source. In some instances, the electrical cord 140 can be omitted and power can be supplied to the flat iron 100 by an internal power source such as one or more single-use or rechargeable batteries. One or more dials or buttons 150, 151, 152 may be used to turn on/off the flat iron 100 and to vary the temperature of the heating plates 116, 126. The temperature of the heating plates 116, 126 at any given moment can be viewed via a display 160.

When the flat iron 100 is in an open position, the first arm 110 and the second arm 120 are positioned such that the heating plates 116, 126 are spaced apart. An open position allows a user to insert hair between the plates 116, 126 to be styled. To move the first arm 110 and the second arm 120 to the closed position, the user applies a clamping pressure to the first and second arms 110, 120 to move the styling portion 124 of the second arm 120 in a pivoting motion toward the styling portion 114 of the first arm 110. When the flat iron 100 is in a closed position, the lava-rock heating plates 116, 126 of the first and second arms 110, 120 are in abutting relation to each other to style, and in particular, straighten the hair captured therebetween. In a closed position, no additional hair can be inserted between the plates 116, 126.

As illustrated by FIGS. 1-2, the heating plates 116, 126 can be described as having substantially flat surfaces. In some instances, the heating plates 116, 126 can have convex surfaces. In other instances, the surfaces of the heating plates 116, 126 can be knobbed, ribbed, grooved, or wavy, can have spike or pyramid-shaped protrusions, or can be otherwise textured. In other instances, the surfaces of the heating plates 116, 126 can have a series of blades extending along the width of the heating plates 116, 126, each blade being triangular prismatic, rectangular, circular, semi-circular, convex or concave.

Each of the heating plates 116, 126 include a heat transmissive plate and a coating comprising volcanic or lava rock and a ceramic ("lava rock coating") on the external surface of the heat transmissive plate. In some instances, each of the heating plates 116, 126 further include a protective coating on the lava rock coating.

In some instances, the heat transmissive plates are made of a metal such as aluminum, iron or copper. In other instances, the heat transmissive plates can be made of an alloy such as steel, brass, bronze, a nickel alloy such as for example a HASTELLOY® brand alloy such as for example nickel-chromium-molybdenum-tungsten, nickel-chromium-molybdenum-tungsten-iron, or nickel-chromium-cobalt alloys, a predominantly iron-nickel-chromium alloy such as for example an INCOLOY® brand alloy, an austenitic nickel-chromium-based alloy (such as for example an INCONEL® alloy), a nickel-copper alloy (such as for example a MONEL® brand alloy), or a cupronickel alloy. In yet other instances, the heat transmissive plates can be made of a porcelain or ceramic such as silicon carbide, aluminum nitride, silicon nitride, alumina ($Al_2O_3$), beryllium oxide (BeO), boron nitride (BN), and titanium dioxide ($TiO_2$).

The lava rock of the lava rock coating may comprise sodium oxide ($Na_2O$) and potassium oxide ($K_2O$), ranging between 0 and 16 wt % in total of the lava rock. The lava rock may comprise silicon oxide ($SiO_2$) and be described as ultramafic (i.e., having <45 wt % $SiO_2$), mafic (45-52 wt % $SiO_2$), intermediate (52-63 wt % $SiO_2$), intermediate-felsic (63-69 wt % $SiO_2$), or felsic (>69 wt % $SiO_2$). Specific examples of lava rock used in lava rock coatings on heat transmissive plates include, but are not limited to, komatiite, picrite basalt, basalt, basaltic andesite, andesite, dacite, rhyolite, nephelinite, melilitite, tephrite, basanite, trachybasalt, basaltic trachyandesite, trachyandesite, trachite, trachydacite, phonotephrite, tephriphonolite, phonolite, scoria, tuff, latite, pumice, and ignimbrite. The ceramic of the lava rock coating can be any suitable ceramic. In some instances, the ceramic of the lava rock coating can be any one of silicon carbide, aluminum nitride, silicon nitride, alumina (a.k.a. aluminum oxide, $Al_2O_3$), beryllium oxide (BeO), boron nitride (BN), and titania (a.k.a. titanium oxide, $TiO_2$).

The lava rock coating can have a thickness ranging from about 5 μm (microns) to about 100 μm (microns), alternatively from about 10 μm (microns) to about 75 μm (microns), alternatively from about 15 μm (microns) to about 50 μm (microns), alternatively from about 20 μm (microns) to about 40 μm (microns), alternatively from about 20 μm (microns) to about 30 μm (microns), and alternatively about 25 μm (microns).

In some instances, the lava rock coating is composed of only a resin having ceramic and lava rock dispersed therein. Preferably, the ceramic and lava rock are homogenously dispersed in the resin. When the resin is only made up of only lava rock, ceramic and a resin, the lava rock coating can have between about 0.1 wt % to about 25 wt % lava rock, alternatively about 0.5 wt % to about 20 wt % lava rock, alternatively about 1 wt % to about 15 wt % lava rock, alternatively about 1.5 wt % to about 10 wt % lava rock, alternatively about 2 wt % to about 5 wt % lava rock, and alternatively about 2.5 wt % to about 3.5 wt % lava rock; and between about 0.1 wt % to about 25 wt % ceramic, alternatively about 0.5 wt % to about 20 wt % ceramic, alternatively about 1 wt % to about 15 wt % ceramic, alternatively about 1.5 wt % to about 10 wt % ceramic, alternatively about 2 wt % to about 5 wt % ceramic, and alternatively about 2.5 wt % to about 3.5 wt % ceramic. In any of the above instances, the remainder of the lava rock coating will be the resin.

In some instances, in addition to a resin, ceramic and lava rock, the lava rock coating can further include some or all of one or more pigments, one or more fillers, one or more surfactants, and tourmaline. When pigments and fillers are present, they can comprise between about 10 wt % and about 33 wt % of the lava rock coating. When one or more surfactants are present, they can comprise between about 0.0125 wt % and 6.25 wt % of the lava rock coating. When tourmaline is present, it can comprise between about 1 wt % and about 3 wt % of the lava rock coating.

The resin of the lava rock coating can be any suitable resin including, but not limited to, a polyphenylene sulfide (PPS) resin having a mass average molecular weight ($M_w$) of 35,000 or more, a silicon-carboxyl resin, a monoaluminum phosphate resin, an alumina silicate resin, a silicone epoxy resin, a polyimide resin, a polysilazane resin such as a perhydropolysilazane, a methylhydridocyclosilazane, an alkylhydridocyclosilazane, and a polyureidosilazane, a polysiloxane, a polyalkylsilsesquioxane resin such as a polymethylsilsesquioxane, a polyvinylsilsequioxane, and a polyphenylsilsesquioxane, a polyphosphazine, a polyborosilane, a polycarbosilazane, a methylpolycarbosilane, a vinylpolycarbosilane, a methylvinylpolycarbosilane, a polytitanocarbosilane, an allyl hydridopolycarbosilane, a hydridopolycarbosilane, a ureamethylvinylsilazane, a polyvinylsiloxane, a polymethylsiloxane, a polydimethylsiloxane, a polycarbosilane, and variants, derivatives and combinations thereof.

The protective coating can be made of any suitable material that is stable at operating temperatures of hairstyling flat irons in accordance with various aspects of the present disclosure. In some instances, the protective coating is made of silicon dioxide. In other instances, the protective coating can be made of a metal oxide such as titanium dioxide or aluminum oxide. The protective coating can be applied to have a thickness ranging from about 100 nanometers (nm) to about 50 μm (microns), alternatively about 500 nm to about 40 μm (microns), alternatively about 1 μm (microns) to about 30 μm (microns), alternatively about 2.5 μm (microns) to about 20 μm (microns), and alternatively about 5 μm (microns) to about 10 μm (microns).

The hairstyling flat iron 100 can have an operational temperature (that is, can be configured to heat the heating plates 116, 126 to a temperature) ranging from room temperature to about 600° F., alternatively about 100° F. to about 500° F., alternatively about 150° F. to about 500° F., and alternatively from about 200° F. to about 450° F.

Figure 3:
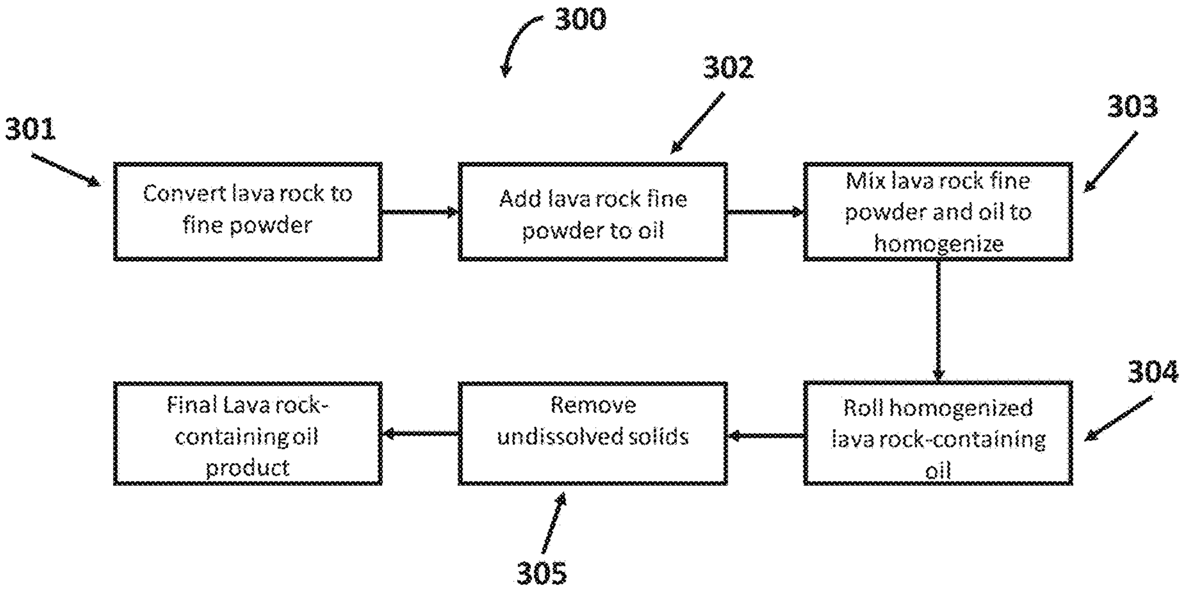
FIG. 3 is a flowchart illustrating an exemplary method of forming a lava rock-containing oil an in accordance with various aspects of the present disclosure.

FIG. 3 is a flow chart illustrating an exemplary method for preparing a lava rock-containing ceramic oil. One of ordinary skill in the art will appreciate that one or more steps of the exemplary method 300 can be omitted, or one or more steps can be added to the exemplary method 300, without imparting from the scope of the present disclosure. The exemplary method 300 can start at block 301. In block 301, a lava rock is converted to a fine powder. The lava rock can be of any type which is capable of being ground into a fine powder. The lava rock can be composed in part of sodium oxide ($Na_2O$) and potassium oxide ($K_2O$), ranging between 0 and 16 wt % in total of the lava rock. The lava rock can also be composed in part of silicon oxide ($SiO_2$) and be described as ultramafic (i.e., having <45 wt % $SiO_2$), mafic (45-52 wt % $SiO_2$), intermediate (52-63 wt % $SiO_2$), intermediate-felsic (63-69 wt % $SiO_2$), or felsic (>69 wt % $SiO_2$). Specific examples of lava rock used in accordance with various aspects of the present disclosure include, but are not limited to, komatiite, picrite basalt, basalt, basaltic andesite, andesite, dacite, rhyolite, nephelinite, melilitite, tephrite, basanite, trachybasalt, basaltic trachyandesite, trachyandesite, trachite, trachydacite, phonotephrite, tephriphonolite, phonolite, scoria, tuff, latite, pumice, and ignimbrite.

The lava rock can be converted to fine powder by any conventional means known to one of ordinary skill in the art such as a ball mill, a tube mill, a ring and ball mill, a bowl mill, a vertical spindle roller mill, a demolition pulverizer, an impact pulverizer, a rock crusher, a chain hammer rock crusher/pulverizer, etc. Upon conversion, the fine powder can consist of lava rock particulates having diameters ranging from about 10 nm to about 25 μm (microns), alternatively from about 10 nm to about 20 μm (microns), alternatively from about 10 nm to about 15 μm (microns), alternatively from about 10 nm to about 10 μm (microns), alternatively from about 10 nm to about 5 μm (microns), alternatively from about 50 nm to about 5 μm (microns), and alternatively from about 100 nm to about 5 μm (microns).

In block 302, the powdered lava rock is then incorporated into a ceramic oil to form a lava rock-containing oil. The ceramic oil can be any suitable coating composition which comprises a ceramic. In some instances, ceramic oils used in accordance with varying aspects of the present disclosure include a ceramic dispersed in a resin. In some instances, ceramic oils used in accordance with varying aspects of the present disclosure include a ceramic-containing resin, one or more color pigments, fillers, water, one or more surfactants and tourmaline. In some instances, the ceramic oil can contain about 30 to about 60 wt % of a ceramic-containing resin, about 10 to about 35 wt % of pigments and fillers (for example, heat-resistant additives) combined, about 10 to about 30 wt % of one or more solvents, about 0.01 to about 5 wt % of one or more surfactants, and about 1 to about 3 wt % tourmaline. A particularly preferred lava rock-containing oil includes a 45-50 wt % of a ceramic-containing resin, about 20 wt % of solvent(s), about 29-30 wt % of heat resistant pigment(s), about 2 wt % of heat resistant additive(s), and about 3 wt % of lava rock(s). For the purposes of this disclosure, the ceramic oil can be considered the combination of ceramic-containing resin, solvent(s), heat resistant pigment(s) and heat resistant additive(s).

Ceramic-containing resins used in accordance with various aspects of the present disclosure can include any suitable ceramic and any suitable resin. In some instances, the ceramic of the ceramic-containing resin can be any one of silicon carbide, aluminum nitride, silicon nitride, alumina ($Al_2O_3$), beryllium oxide (BeO), boron nitride (BN), and titania ($TiO_2$). The resin of the ceramic-containing resin can be any suitable resin including, but not limited to, a polyphenylene sulfide (PPS) resin having a mass average molecular weight (Mw) of 35,000 or more, a silicon-carboxyl resin, a monoaluminum phosphate resin, an alumina silicate resin, a silicone epoxy resin, a polyimide resin, a polysilazane resin such as a perhydropolysilazane, a methylhydridocyclosilazane, an alkylhydridocyclosilazane, and a polyureidosilazane, a polysiloxane, a polyalkylsilsesquioxane resin, such as a polymethylsilsesquioxane, a polyvinylsilsequioxane, and a polyphenylsilsesquioxane, a polyphosphazine, a polyborosilane, a polycarbosilazane, a methylpolycarbosilane, a vinylpolycarbosilane, a methylvinylpolycarbosilane, a polytitanocarbosilane, an allyl hydridopolycarbosilane, a hydridopolycarbosilane, a ureamethylvinylsilazane, a polyvinylsiloxane, a polymethylsiloxane, a polydimethylsiloxane, a polycarbosilane, variants, derivatives and combinations thereof.

The one or more color pigments of the ceramic oil can be any suitable pigments. The pigments can be used to impart the ceramic oil and subsequently formed lava rock coating with a desired color such as, for example, a shade of red, a shade of green, a shade of blue, a shade of orange, a shade of yellow, a shade of indigo, a shade of violet, black, grey, brown, white, etc. The pigments can be in the form of a paint.

The one or more solvents can include, but are not limited to water, alcohols (for example, methanol, ethanol, propanol, isopropanol, tert-butanol), chlorinated solvents (for example chloroform and methylene chloride), alkanes (for example, hexanes, octane, dodecane and octadecane), aromatics (for example, benzene, toluene, xylenes, and ethylbenzene), acetonitrile, tetrahydrofuran, dimethyl sulfoxide, pyridine, and so on.

After addition of the lava rock to the oil, the resulting mixture can comprise between about 0.1 wt % to about 25 wt % lava rock and about 75 wt % to about 99.9 wt % ceramic oil, alternatively about 0.5 wt % to about 20 wt % lava rock and about 80 wt % to about 99.5 wt % ceramic oil, alternatively about 1 wt % to about 15 wt % lava rock and about 85 wt % to about 99 wt % ceramic oil, alternatively about 1.5 wt % to about 10 wt % lava rock and about 80 wt % to about 99.5 wt % ceramic oil, alternatively about 2 wt % to about 5 wt % lava rock and about 95 wt % to about 98 wt % ceramic oil, and alternatively about 2.5 wt % to about 3.5 wt % lava rock and about 96.5 wt % to about 97.5 wt % ceramic oil. In some instances, the resulting mixture can comprise about 3 wt % lava rock and about 97 wt % ceramic oil.

In block 303, the lava rock-containing ceramic oil is mixed for a period of time sufficient to ensure homogenization. Mixing in block 303 can take place for a period of time ranging from about 15 minutes to about 5 hours, alternatively from about 30 minutes to about 4 hours, alternatively from about 1 hour to about 3 hours, and alternatively about 2 hours. In some instances, mixing is performed using a mechanical mixing apparatus fitted with an impeller. When mixing with a mechanical mixing apparatus, the impeller can rotate in the lava rock-containing oil at a rate ranging from about 25 rpm to about 500 rpm, alternatively about 50 rpm to about 400 rpm, alternatively about 75 rpm to about 300 rpm, alternatively about 75 rpm to about 200 rpm, and alternatively about 75 rpm to about 150 rpm. In some instances, mixing of the lava rock-containing oil can be accomplished by ultrasonication using an ultrasonic bath or an ultrasonic probe. In other instances, mixing of the lava rock-containing oil can be accomplished by shaking or agitation. In general, mixing is performed at room temperature. Mixing in block 303, however, can be performed at any temperature below the boiling point of the oil and other components therein.

In block 304, the homogenized lava rock-containing oil from block 303 is placed in a cylindrical vessel and the vessel is sealed. The cylindrical vessel is then rolled along the longitudinal axis of the sealed cylinder for a period of time sufficient to allow the powdered lava rock to dissolve in, and react with, the oil. Rolling in block 304 can take place for a period of time ranging from about 4 hours to about 48 hours, alternatively from about 6 hours to about 36 hours, alternatively from about 8 hours to about 24 hours, alternatively from about 10 hours to about 16 hours, and alternatively about 12 hours. Rolling in block 304 can be performed at a rate ranging from about 25 rpm to about 500 rpm, alternatively about 50 rpm to about 450 rpm, alternatively about 75 rpm to about 400 rpm, alternatively about 100 rpm to about 350 rpm, alternatively about 150 rpm to about 350 rpm and alternatively about 200 rpm to about 300 rpm. In general, rolling is performed at room temperature. Rolling in block 304, however, can be performed at any temperature below the boiling point of the oil.

In block 305, undissolved solids are removed from the rolled lava rock-containing ceramic oil of block 304 to obtain the final lava rock-containing ceramic oil product. In some instances, undissolved solids are removed from the rolled lava rock-containing ceramic oil of block 304 by a filtration procedure such as gravity filtration or vacuum filtration. In other instances, undissolved solids can be removed from the rolled lava rock-containing ceramic oil of block 304 by centrifugation and decantation steps. In yet other instances undissolved solids can be removed from the rolled lava rock-containing ceramic oil of block 304 by centrifugation and in a vessel having an openable port in a bottom portion of the vessel and opening the port to allow undissolved solids to exit therefrom.

Figure 4:
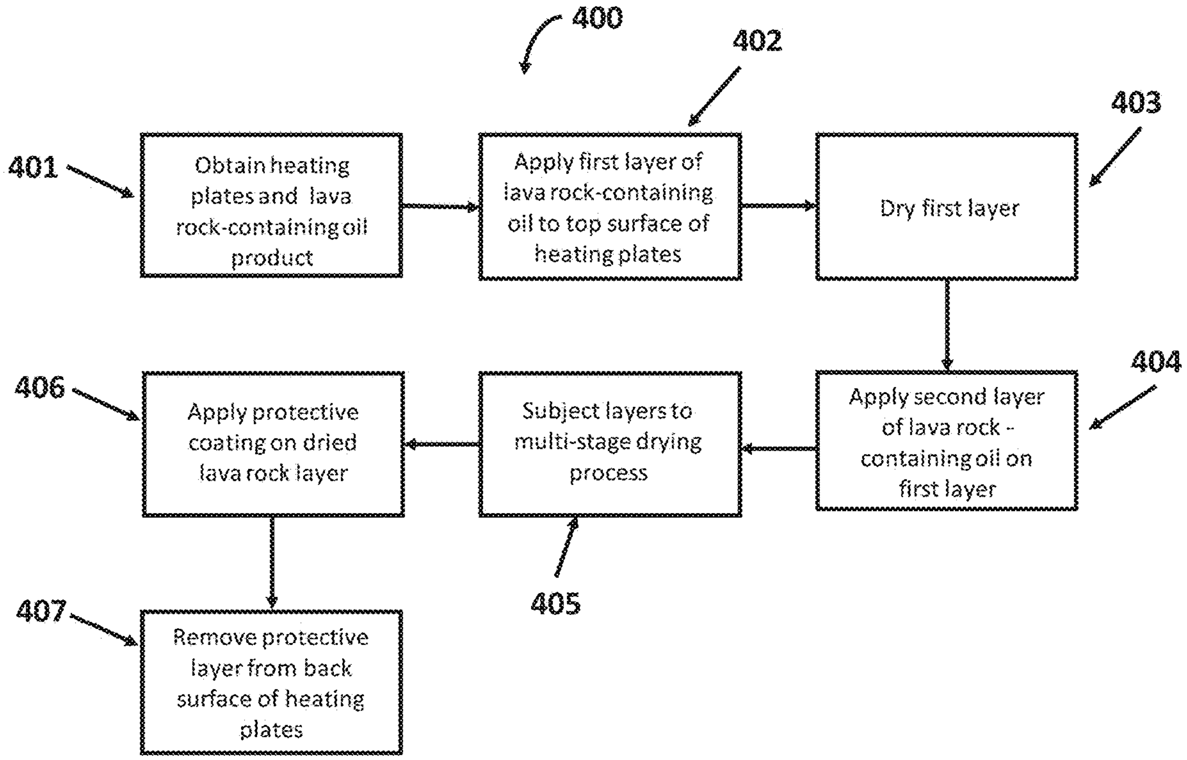
FIG. 4 is a flowchart illustrating an exemplary method of forming lava rock-coated heating plates for use in a hair styling flat iron in accordance with various aspects of the present disclosure.

FIG. 4 is a flow chart illustrating an exemplary method for preparing lava rock-coated heating plates. One of ordinary skill in the art will appreciate that one or more steps of the exemplary method 400 can be omitted, or one or more steps can be added to the exemplary method 400, without imparting from the scope of the present disclosure. The exemplary method 400 can start at block 401. In block 401, heating plates for use in a hairstyling flat iron, such as the flat iron 100, and the final lava rock-containing oil product from block 305 are obtained. In some instances, the heating plates are made of a metal such as aluminum, iron or copper. In other instances, the heating plates can be made of an alloy such as steel, brass, bronze, a Hastelloy® alloy such as a nickel-chromium-molybdenum-tungsten, nickel-chromium-molybdenum-tungsten-iron, nickel-chromium-cobalt, an Inconoly® alloy such as iron-nickel-chromium or iron-nickel-chromium, an austenitic nickel-chromium-based alloy (Inconel®), a nickel-copper alloy (Monel®), or a cupronickel alloy. In yet other instances, the heating plates can be made of a porcelain or ceramic such as silicon carbide, aluminum nitride, silicon nitride, alumina ($Al_2O_3$), beryllium oxide (BeO), boron nitride (BN), and titania ($TiO_2$). The heating plates can be described as having a top surface which will be coated with the lava rock-containing oil product and a bottom surface which will not be coated with the lava rock-containing oil product.

In block 402, a first layer of the lava rock-containing ceramic oil product is applied to the top surface of the heating plates. In some instances, the lava rock-containing ceramic oil product is applied to the top surface of the heating plates via spray coating. In other instances, the lava rock-containing ceramic oil product can be applied to the top surface of the heating plates via brush coating. In yet other instances, the lava rock-containing ceramic oil product can be applied to the top surface of the heating plates via blade coating. In yet other instances, the lava rock-containing ceramic oil product can be applied to the top surface of the heating plates via spin coating. In yet other instances, the lava rock-containing ceramic oil product can be applied to the top surface of the heating plates via dip coating. In any of the above coating techniques, a protective layer, such as a tape or film, can first be applied to the back surface of the heating plates to prevent application of the lava rock-containing ceramic oil product to the back surface.

In block 403, the first layer of the lava rock-containing ceramic oil product is subjected to a brief drying period. The temperature of the brief drying period of block 403 can range from 60° C. to about 120° C., alternatively from about 70° C. to about 100° C., alternatively from about 75° C. to about 90° C., and alternatively about 80° C. The time for drying in block 403 can range from about 30 seconds to 10 minutes, alternatively about 1 minute to about 5 minutes, alternatively about 1 minute to about 3 minutes, and alternatively about 2 minutes.

In block 404, a second layer of the lava rock-containing ceramic oil product is applied onto the first layer. Application of the second layer of the lava rock-containing ceramic oil product in block 404 can be accomplished using the same procedure as in block 402.

In block 405, the heating plates, now coated with two layers of the lava rock-containing ceramic oil product, are subjected to a multi-stage drying process which comprises at least first stage and a second stage. The first drying stage can be conducted at a temperature ranging from about 100° C. to about 200° C., alternatively from about 110° C. to about 180° C., alternatively from about 120° C. to about 160° C., alternatively from about 120° C. to about 140° C., and alternatively about 130° C. The first drying stage can be conducted for a period of time ranging from about 5 minutes to about 1 hour, alternatively from about 10 minutes to about 45 minutes, alternatively from about 10 minutes to about 30 minutes, and alternatively about 15 minutes. The second drying stage can be conducted at a temperature ranging from about 200° C. to about 400° C., alternatively from about 210° C. to about 350° C., alternatively from about 220° C. to about 300° C., alternatively from about 230° C. to about 280° C., alternatively from about 240° C. to about 260° C., and alternatively about 250° C. The second drying stage can be conducted for a period of time ranging from about 30 minutes to about 4 hours, alternatively from about 45 minutes to about 3 hours, alternatively from about 1 hour to about 2 hours, and alternatively about 1.5 hours. In other instances, the first stage is conducted at a higher temperature than the second stage. After the multistage drying process is completed, the top surface of the heating plates will have a dried lava rock and ceramic-containing resin layer having a thickness ranging from about 5 μm (microns) to about 100 μm (microns), alternatively from about 10 μm (microns) to about 75 μm (microns), alternatively from about 15 μm (microns) to about 50 μm (microns), alternatively from about 20 μm (microns) to about 40 μm (microns), alternatively from about 20 μm (microns) to about 30 μm (microns), and alternatively about 25 μm (microns).

The layers applied in blocks 402 and 404 can be of the same thickness or of substantially the same thickness prior to drying. In some instances, the first layer can be applied in block 402 to have a larger thickness than the thickness of the second layer applied in block 404. In some instances, the first layer can be applied in block 402 to have a smaller thickness than the thickness of the second layer applied in block 404. In some instances, one or more of blocks 402-404 can be repeated prior to block 405.

In block 406, a protective coating can be applied to the dried lava rock and ceramic-containing layer. The protective layer serves to protect the underlying dried lava rock layer from the external environment and to provide a smooth surface for use when styling hair with the hairstyling flat iron. The protective coating can be made of any suitable material that is stable at operating temperatures of hairstyling flat irons in accordance with various aspects of the present disclosure. In some instances, the protective coating is made of silicon dioxide. In other instances, the protective coating can be made of a metal oxide such as titanium dioxide or aluminum oxide. The protective coating can be applied to have a thickness ranging from about 100 nanometers (nm) to about 50 μm (microns), alternatively about 500 nm to about 40 μm (microns), alternatively about 1 μm (microns) to about 30 μm (microns), alternatively about 2.5 μm (microns) to about 20 μm (microns), and alternatively about 5 μm (microns) to about 10 μm (microns).

In block 407, the protective layer is removed from the back surface of the heating plates. If a protective layer is not added to the back surface of the heating plates, however, block 407 will be omitted from the exemplary method 400.

After the lava rock-coated heating plates are formed by a method, such as the exemplary method 400, they may be incorporated into a hairstyling iron, such as the hairstyling flat iron 100.

Figure 5:
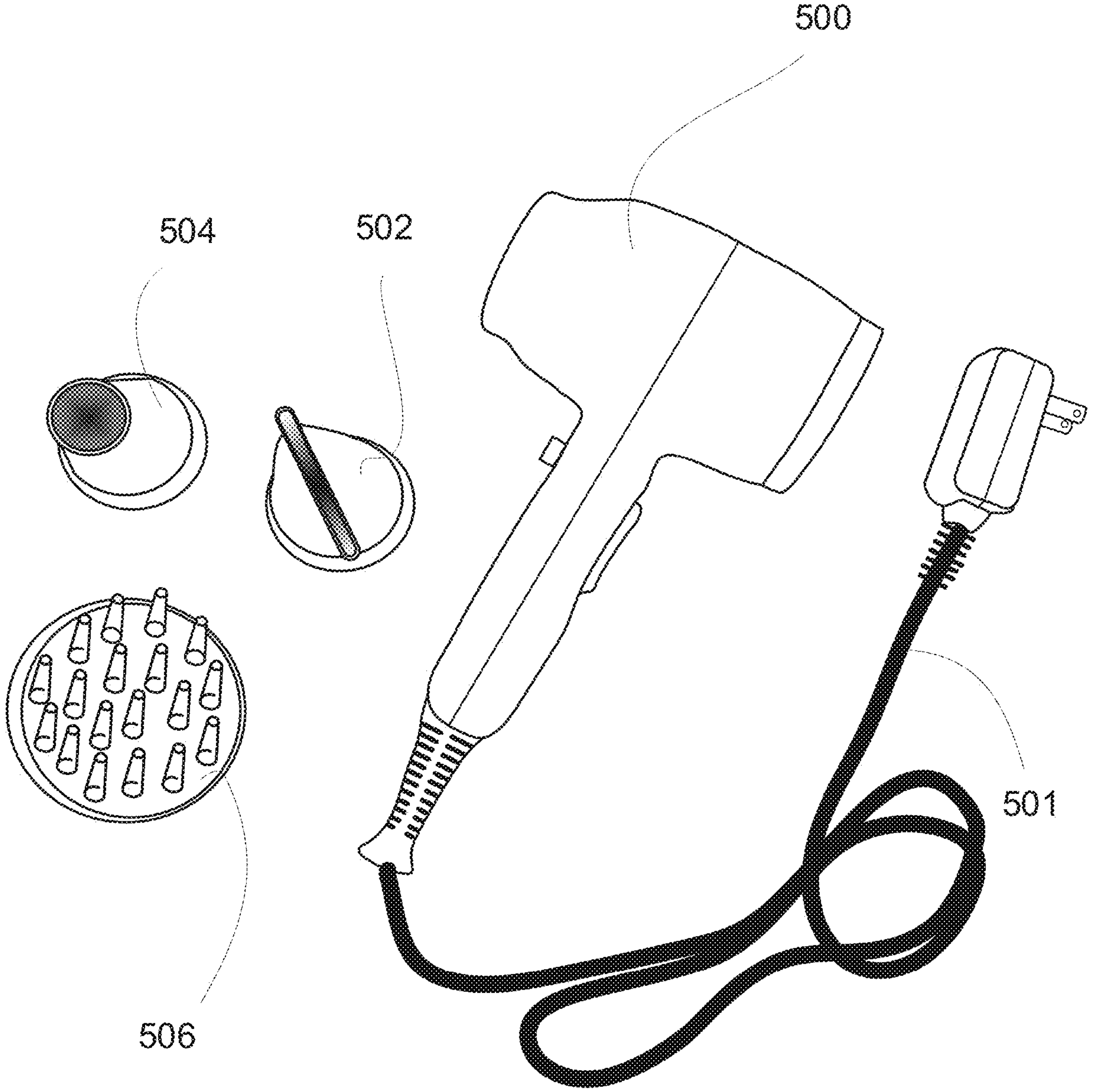
FIG. 5 is a schematic view of a hair dryer and associated attachments in accordance with various aspects of the present disclosure.

FIG. 5 is a view of a hair dryer 500 in accordance with various aspects of the present disclosure. As depicted in FIG. 5, various accessories may be utilized with dryer 500 including heated air focusing attachment 502, heated air focusing attachment 504, a heated air diffusing attachment 506 or a heated air focusing attachment having hair comb bristles incorporated thereon (not shown). Electricity, in the form of alternating or direct current, may be provided to the hair dryer 500 via an electrical cord 501 from a conventional external electricity source, where the electrical cord 501 is electrically couplable with the external electricity source. In some instances, the electrical cord 501 can be omitted and power can be supplied to the hair dryer 500 by an internal power source such as one or more single-use or rechargeable batteries.

Figure 6:
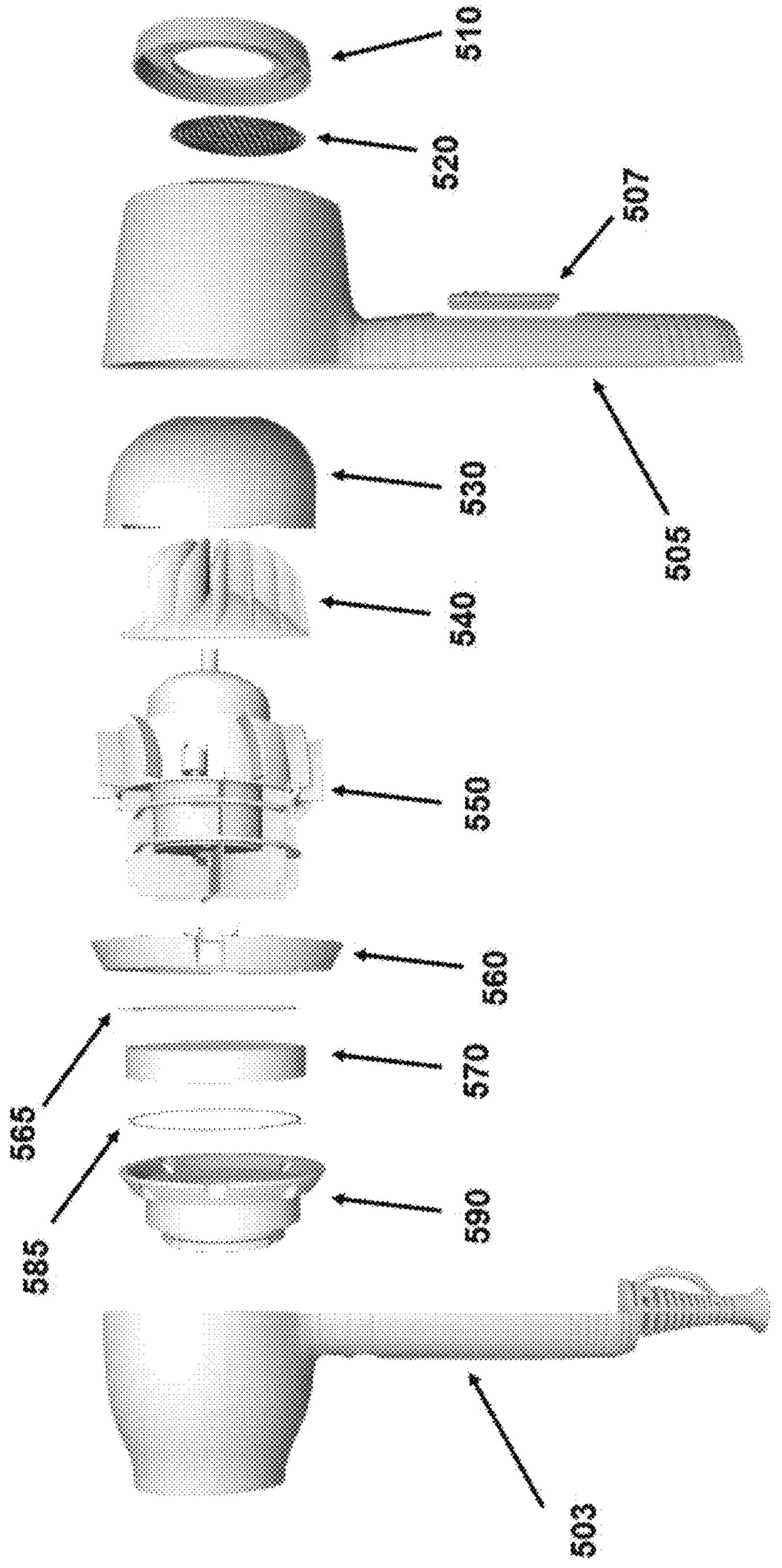
FIG. 6 is an exploded view of the hair dryer of FIG. 5 in accordance with various aspects of the present disclosure.
Figure 7:
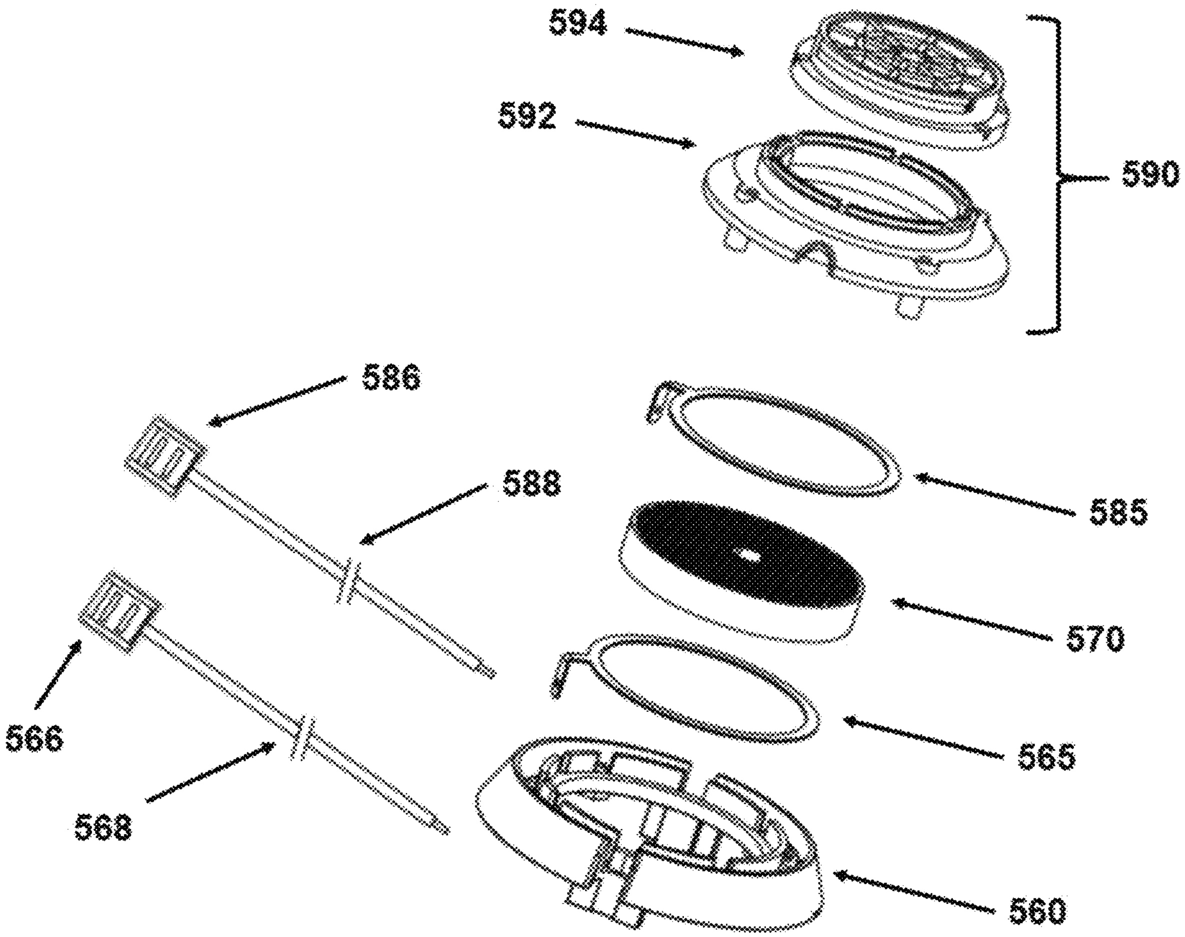
FIG. 7 is another exploded view of certain components of the hair dryer of FIG. 5 in accordance with various aspects of the present disclosure.

FIGS. 6-7 are exploded views showing components of the hair dryer 500 in accordance with various aspects of the present disclosure. As shown FIGS. 6-7, the hair dryer 500 includes a first housing member 503, a second housing member 505, one or more actuatable switches 507, a retention ring 510, an air permeable member 520, a blade assembly retention cup 530, a blade assembly 540, a motor 550, a first positive temperature coefficient (PTC) heating element housing bracket 560, a PTC heating element 570, a second PTC heating element housing bracket 590, a first electrode 565 and a second electrode 585. A first terminal plug 566 is electrically coupled with the first electrode 565 via a first wire 568 and a second terminal plug 586 is electrically coupled the second electrode 585 via a second wire 588. The first electrode 565 and the second electrode 585 contact opposing surfaces of the PTC heating element 570. The second PTC heating element housing bracket 590 includes a housing ring 592 couplable with the first PTC heating element housing bracket 560 and an air permeable member 594. In use, atmospheric air is pulled into the hair dryer 500 through the second housing member 505 via the air permeable member 520 using the blade assembly 540 and the motor 550. The air is then heated by the PTC heating element 570. The heated air then exits the hair dryer 500 through the first housing member 503 via the air permeable member 594. The one or more actuatable switches 507 can be used to control the rate at which the motor 550 rotates the blade assembly 540 and resultantly the rate at which air is pulled into the hair dryer 500. The one or more actuatable switches 507 can also be used to control the temperature of the PTC heating element 570 via the first electrode 565 and the second electrode 585.

Figure 8A:
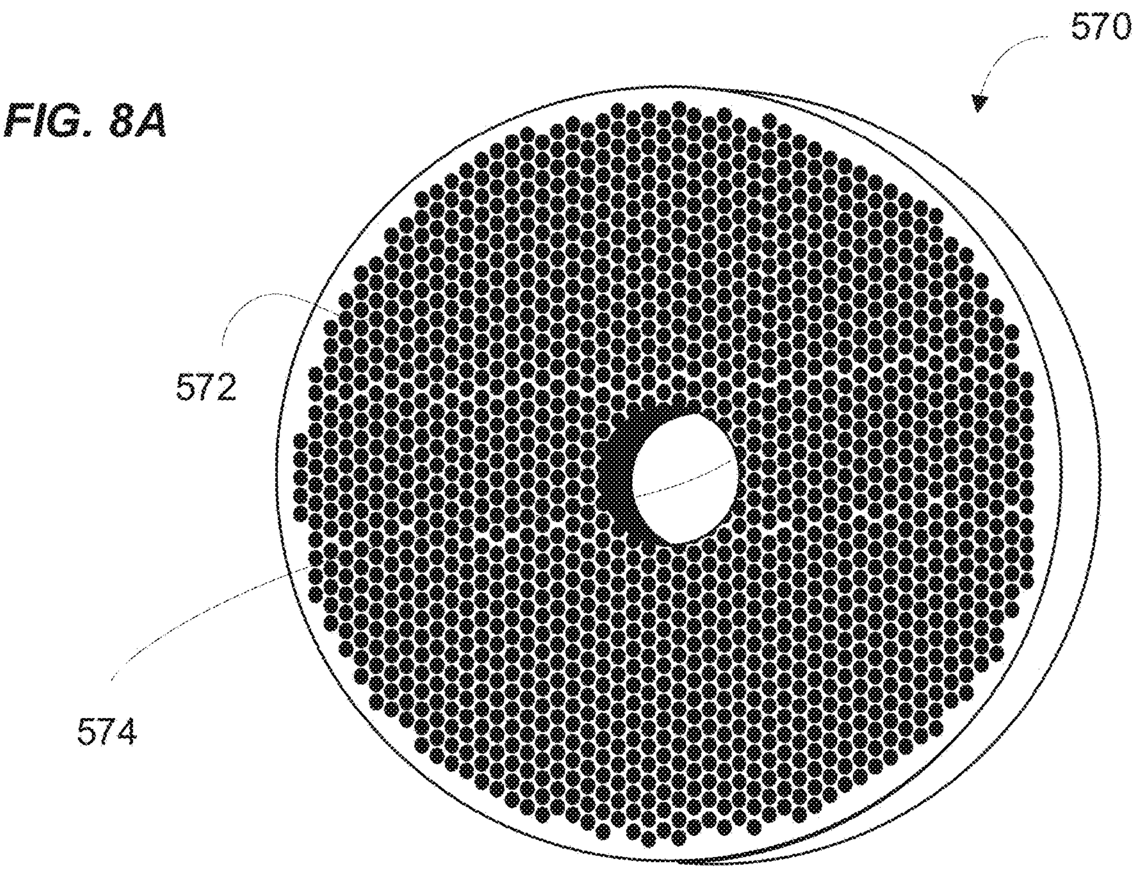
FIG. 8A is a schematic view of a honeycomb positive temperature coefficient (PTC) heating element of a hair dryer in accordance with various aspects of the present disclosure.
Figure 8B:
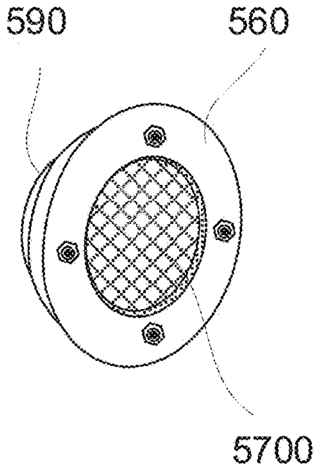
FIG. 8B is a schematic view of a mesh PTC heating element of a hair dryer in accordance with various aspects of the present disclosure.
Figure 8C:
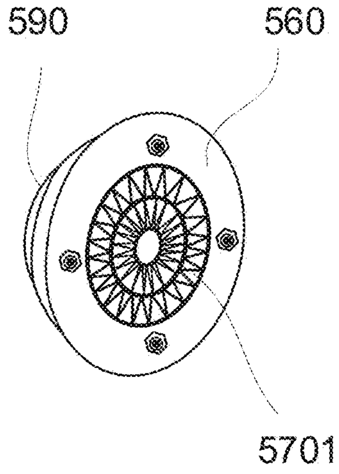
FIG. 8C is a schematic view of a corrugated fin PTC heating element of a hair dryer in accordance with various aspects of the present disclosure.
Figure 8D:
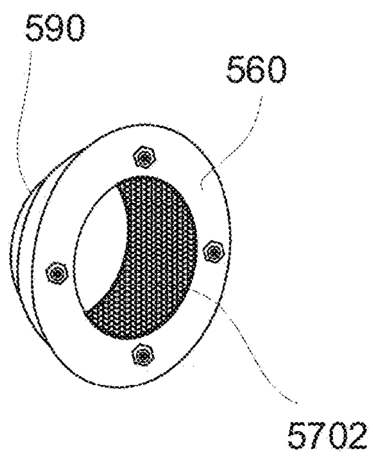
FIG. 8D is a schematic view of a cylindrical PTC heating element of a hair dryer in accordance with various aspects of the present disclosure.

The PTC heating element 570 can take various forms but should be configured to allow air to pass therethrough while concomitantly heating the air. FIG. 8A is an enlarged view of a honeycomb PTC heating element 570 including a plurality of small through holes 572 and a large central hole 574. FIG. 8B depicts an embodiment of a mesh PTC heating element 5700 disposed within the first PTC heating element housing bracket 560 and the second PTC heating element housing bracket 590. FIG. 8C depicts an embodiment of a corrugated fin PTC heating element 5701 disposed within the first PTC heating element housing bracket 560 and the second PTC heating element housing bracket 590. FIG. 8D depicts an embodiment of a cylindrical PTC heating element 5702 disposed within the first PTC heating element housing bracket 560 and the second PTC heating element housing bracket 590. The PTC heating elements 570, 5700 and 5701 are generally the shape of a circular disc. The PTC heating element 5702 is generally the shape of a cylinder. In some instances, PCT heating elements in accordance with various aspects of the present disclosure can be other shapes such as frustoconical, cubic, rectangular prismatic, triangular prismatic, hexagonal prismatic, spherical, hemispherical, or any other suitable three-dimensional shape. The composition of the PTC heating elements 570, 5700, 5701 and 5702 is not particularly limiting; any suitable PTC material may be used.

Each of the PTC heating elements 570, 5700, 5701 and 5702 include a coating on the outer surface thereof, the coating comprising volcanic or lava rock and a ceramic ("lava rock coating") as previously described. The lava rock coating can be the same composition and coating thickness as with the flat iron 100. In some instances, the PTC heating elements 570, 5700, 5701 and 5702 further include a protective coating on the lava rock coating also as previously described.

Figure 9:
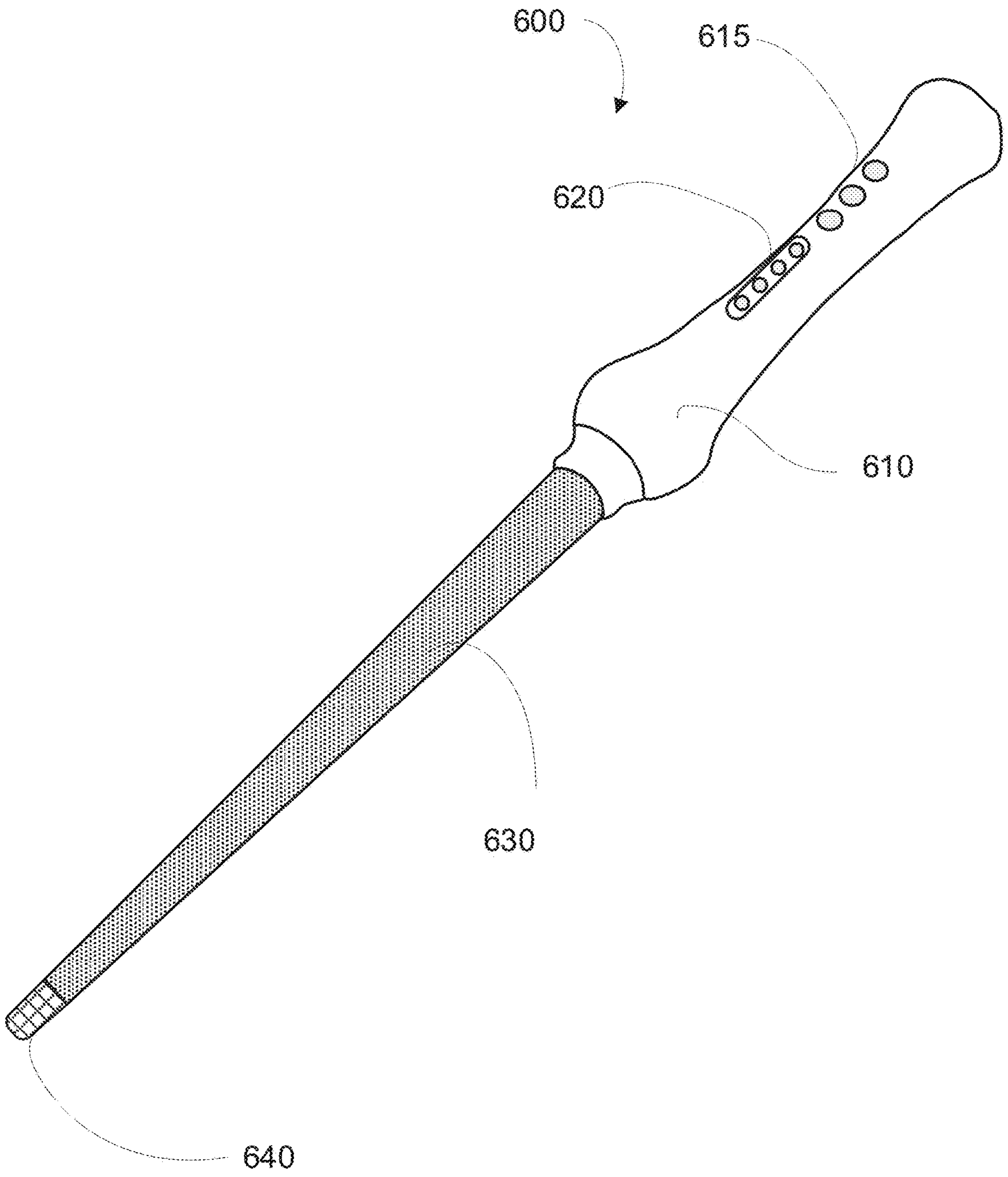
FIG. 9 is a schematic view of a tapered curling wand in accordance with various aspects of the present disclosure.

FIG. 9 is a view of a tapered curling wand 600 in accordance with various aspects of the present disclosure. As depicted in FIG. 9, the curling wand 600 includes a first handle portion 610, a styling portion 630, and a second handle portion 640. Electricity, in the form of alternating or direct current, may be provided to the curling wand 600 via an electrical cord (not shown) from a conventional external electricity source, where the electrical cord is electrically couplable with the external electricity source. In some instances, the electrical cord can be omitted and power can be supplied to the curling wand 600 by an internal power source such as one or more single-use or rechargeable batteries. One or more dials or buttons 615, may be used to turn on/off the curling wand 600 and to vary the temperature of the styling portion 630. Additionally and/or alternatively, a plurality of buttons 620, where each of the plurality of buttons 620 corresponds to a specific preset styling portion 630 temperature, can be used. For example, in FIG. 9, the plurality of buttons 620 comprises four buttons, where a first button corresponds to a preset styling portion 630 temperature of 300° F., a second button corresponds to a preset styling portion 630 temperature of 340° F., a third button corresponds to a preset styling portion 630 temperature of 380° F., and a fourth button corresponds to a preset styling portion 630 temperature of 410° F. In some instances, the first handle portion 610 further includes a display (not shown) which can show information such as battery charge, real-time styling portion 630 temperature, and so on.

The styling portion 630 can be described as having a heat transmissive cylinder with a substantially flat external surface and an electric heating element (not shown) disposed within the hollow interior the heat transmissive cylinder to warm the styling portion 630 to a predetermined temperature by a user via the one or more dials or buttons 615 or the plurality of buttons 620 and a printed circuit board (PCB; not shown), located within the first handle portion 610, in electrical communication with the heating element and the one or more dials or buttons 615 or the plurality of buttons 620. The heat transmissive cylinder can have a tapered, or frustoconical, shape such that the diameter of the styling portion 630 adjacent to the first handle portion 610 is larger than the diameter of the styling portion 630 adjacent to the second handle portion 640. In some instances, the heat transmissive cylinder can be described as having a substantially flat surface and having a uniform cylindrical shape where the diameter of the styling portion 630 adjacent to the first handle portion 610 is the same as the diameter of the styling portion 630 adjacent to the second handle portion 640.

In some instances, portions of the surface of the styling portion 630 can be knobbed, ribbed, grooved, or wavy, can have spike-, pyramid- or otherwise-shaped protrusions, or can be otherwise textured. The heat transmissive cylinder of the styling portion 630 includes a coating comprising volcanic or lava rock and a ceramic ("lava rock coating") on the external surface of the heat transmissive cylinder as previously described. The heat transmissive cylinder can be made of the same type of materials described for the heat transmissive plates of the flat iron 100 and the lava rock coating can be the same composition and coating thickness as with the flat iron 100. In some instances, the styling portion 630 further includes a protective coating on the lava rock coating also as previously described.

Figure 10:
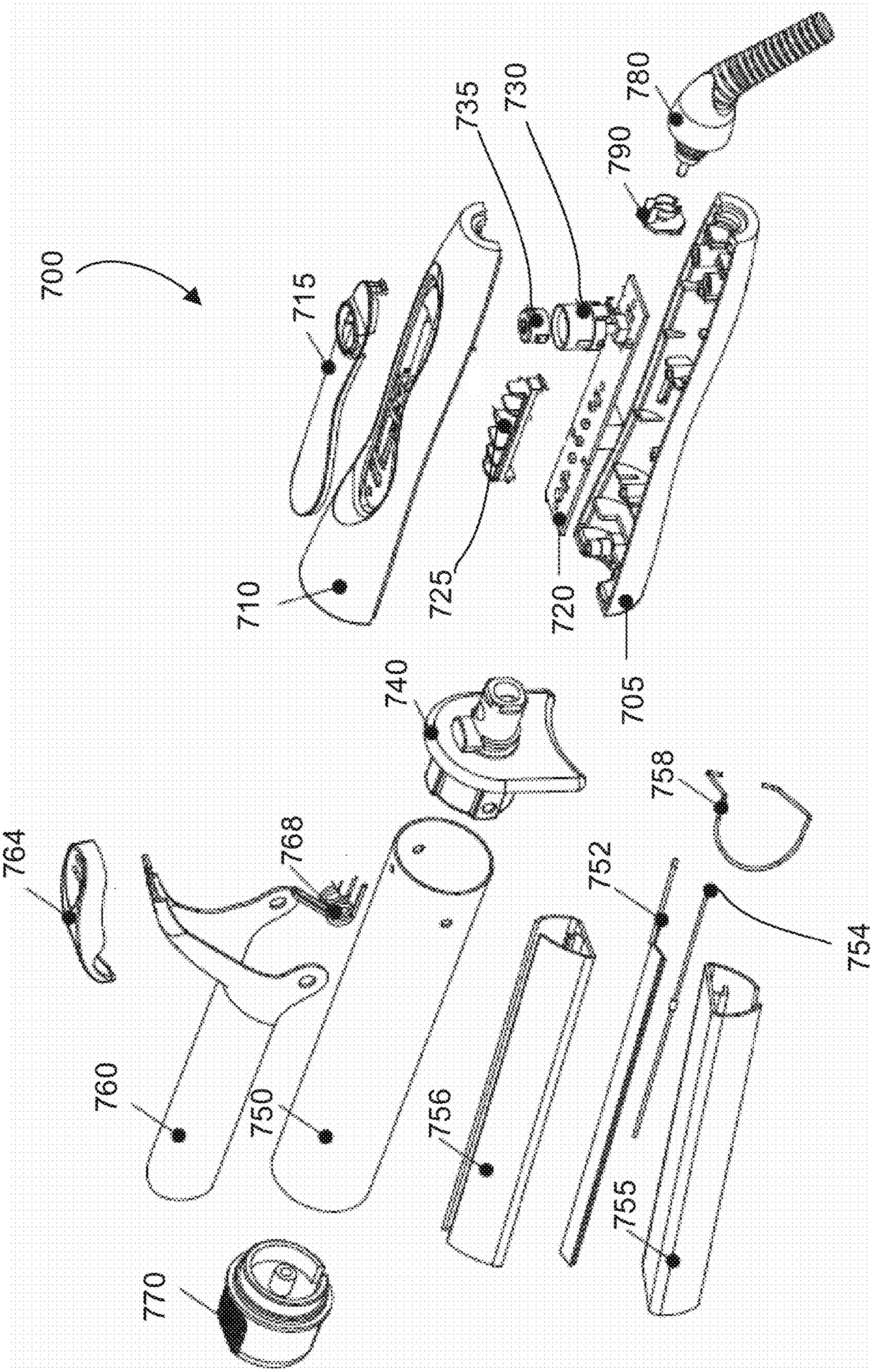
FIG. 10 is an exploded view of a manual curling iron in accordance with various aspects of the present disclosure.

FIG. 10 is an exploded view of a manual curling iron 700 in accordance with various aspects of the present disclosure. The curling iron 700 includes handle comprising a first handle portion 705, a second handle portion 710, a lens 715 (which can be transparent, translucent and/or pigmented) incorporated into an external surface of the second handle portion 710, and a printed circuit board (PCB) 720 contained within the first handle portion 705 and the second handle portion 710. The handle further includes a lens support 725, a control button 735, actuatable by a user through the lens 715, and control button support 730. The curling iron further includes and heat transmissive cylinder 750 coupled to the handle via a connector unit 740. Disposed within the heat transmissive cylinder 750 is a positive temperature coefficient (PTC) heating element 752, a negative temperature coefficient (NTC) heating element 754, a first heat transmissive unit 755, a second heat transmissive unit 756 and support member 758. The first heat transmissive unit 755 and the second heat transmissive unit 756 are configured to sandwich the PTC 752 and the NTC 754 therebetween and, in combination, sized to approximate the interior dimensions of the heat transmissive cylinder 750. The support member 758 is configured to hold the first heat transmissive unit 755 and the second heat transmissive unit 756 in place within the heat transmissive cylinder 750. The PTC 752 and the NTC 754 are electrically coupled with the PCB 720. A thermally insulative cap 770 is coupled to an end of the heat transmissive cylinder 750 opposite the connector unit 740. The curling iron 700 further includes curling clip 760 dimensioned to uniformly or substantially uniformly engage a portion of the outer surface of the heat transmissive cylinder 750 and force a user's hair to contact the outer surface of the heat transmissive cylinder 750. The curling clip 760 further includes a clip cap 764 for user actuation and a biasing element 768 (shown here as a spring assembly) coupling the curling clip 760 with the heat transmissive cylinder 750 and allowing for movement of the curling clip 760 relative to the outer surface of the heat transmissive cylinder 750. The curling iron 700 further includes a power cord 780 and power cord port 790 for providing electricity, in the form of alternating or direct current, from a conventional external electricity source. In some instances, an internal power source such as one or more single-use or rechargeable batteries can be incorporated within the first handle portion 705 and the second handle portion 710.

The heat transmissive cylinder 750 includes a coating on the outer surface thereof, the coating comprising volcanic or lava rock and a ceramic ("lava rock coating") as previously described. Each of the heat transmissive cylinder 750, the first heat transmissive unit 755 and the second heat transmissive unit 756 can be made of the same type of materials described for the heat transmissive plates of the flat iron 100 and the lava rock coating can be the same composition and coating thickness as with the flat iron 100. In some instances, the heat transmissive cylinder 750 further includes a protective coating on the lava rock coating also as previously described.

Components of an automatic hair curler 800 are illustrated in, as shown in FIGS. 11-14. As detailed below, the automatic hair curler 800 may include a handle 805, a hair curling component installed on the handle 805 and a driving device. When in use, under the action of the driving device, the hair curling component starts working to accomplish a hair curling process, and since a user holds the handle 805, scalding may be avoided.

The hair curling component may include a shell 810, a heat transmissive cylinder 820 and a rotating seat 830. The shell 810 may extend at least partially around (and up to entirely around) the circumference of the heat transmissive cylinder 820, and may extend a height axially overlapping the entire height of the heat transmissive cylinder 820. The shell 810 may be radially spaced from the heat transmissive cylinder 820, such that hair may be inserted between the shell 810 and the heat transmissive cylinder 820. In some embodiments, the rotating seat 40 may be disposed between the heat transmissive cylinder 820 and the shell 810, wherein the heat transmissive cylinder 820, rotating seat 830 and shell 810 may be radially spaced apart from each other, and wherein hair may be inserted between the heat transmissive cylinder 820 and the rotating seat 830. The rotating seat 830 may extend at least partially around a circumference of the heat transmissive cylinder 820 and may extend a height from the handle 805 that at least partially overlaps the heat transmissive cylinder 820.

Figure 11:
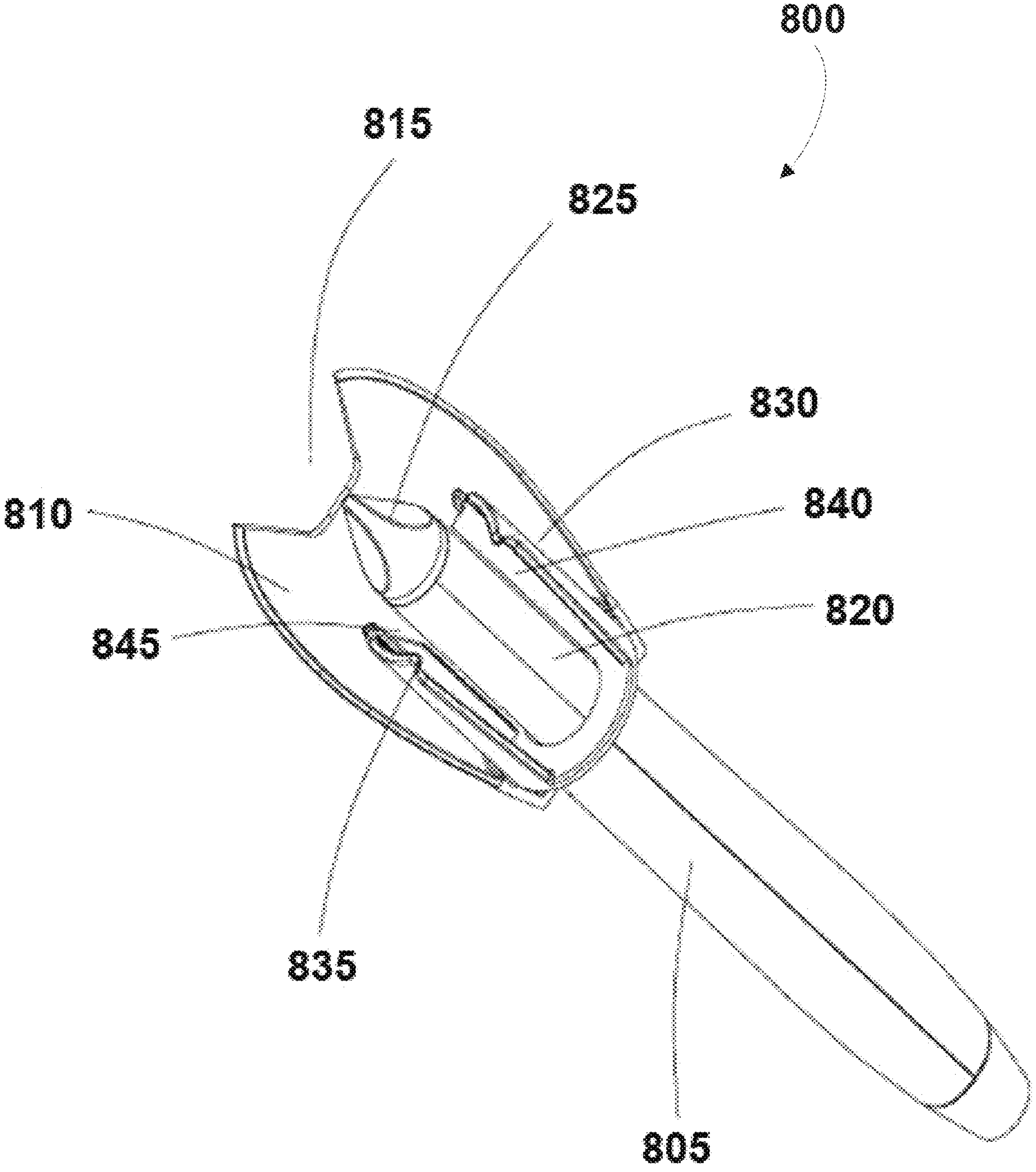
FIG. 11 is a partial sectional view of an automatic hair curler in accordance with various aspects of the present disclosure.

FIG. 11 shows a partial sectional view of an automatic hair curler according to embodiments of the present disclosure, where a portion of the shell 810 is sectioned to show the internal features, including the heat transmissive cylinder 820 and the rotating seat 830. As shown, a shifting part 835 for shifting hair may be arranged on the rotating seat 830. Both of the heat transmissive cylinder 820 and the shell 810 are fixed on the handle 805, while the rotating seat 830 is sleeved around the outside of the heat transmissive cylinder 820 and can rotate relative to the heat transmissive cylinder 820 under the drive of the driving device. Meanwhile, a hair curling cavity 845 used for curling the hair can be formed between an outer surface of the heat transmissive cylinder 820 and an inner surface of the rotating seat 830, where an upper end of the hair curling cavity 845 is open. In addition, a notch 815 in communication with the hair curling cavity 845 is formed on the shell 810, where the notch 815 extends from a top end face of the shell 810 downwards. In this way, during use by the user, the hair may be put in the hair curling cavity 845 via the notch 815, and under the drive of the driving device, the rotating seat 830 starts rotating. Since both the shell 810 and a mounting shaft 855 are fixed relative to the handle 805, a shifting part 835 arranged on the rotating seat 830 can wind the hair on the heat transmissive cylinder 820 with the rotation of the rotating seat 830, where a curling effect of the hair wound on the heat transmissive cylinder 820 can be achieved in a continuous heating process of the heat transmissive cylinder 820. Furthermore, due to the arrangement of the shell 810 and the rotating seat 830, the user can be effectively isolated from a heat source of the heat transmissive cylinder 820 to avoid scalding the user by the heat transmissive cylinder 820 in a hair curling process, thus being safer to use.

Figure 12:
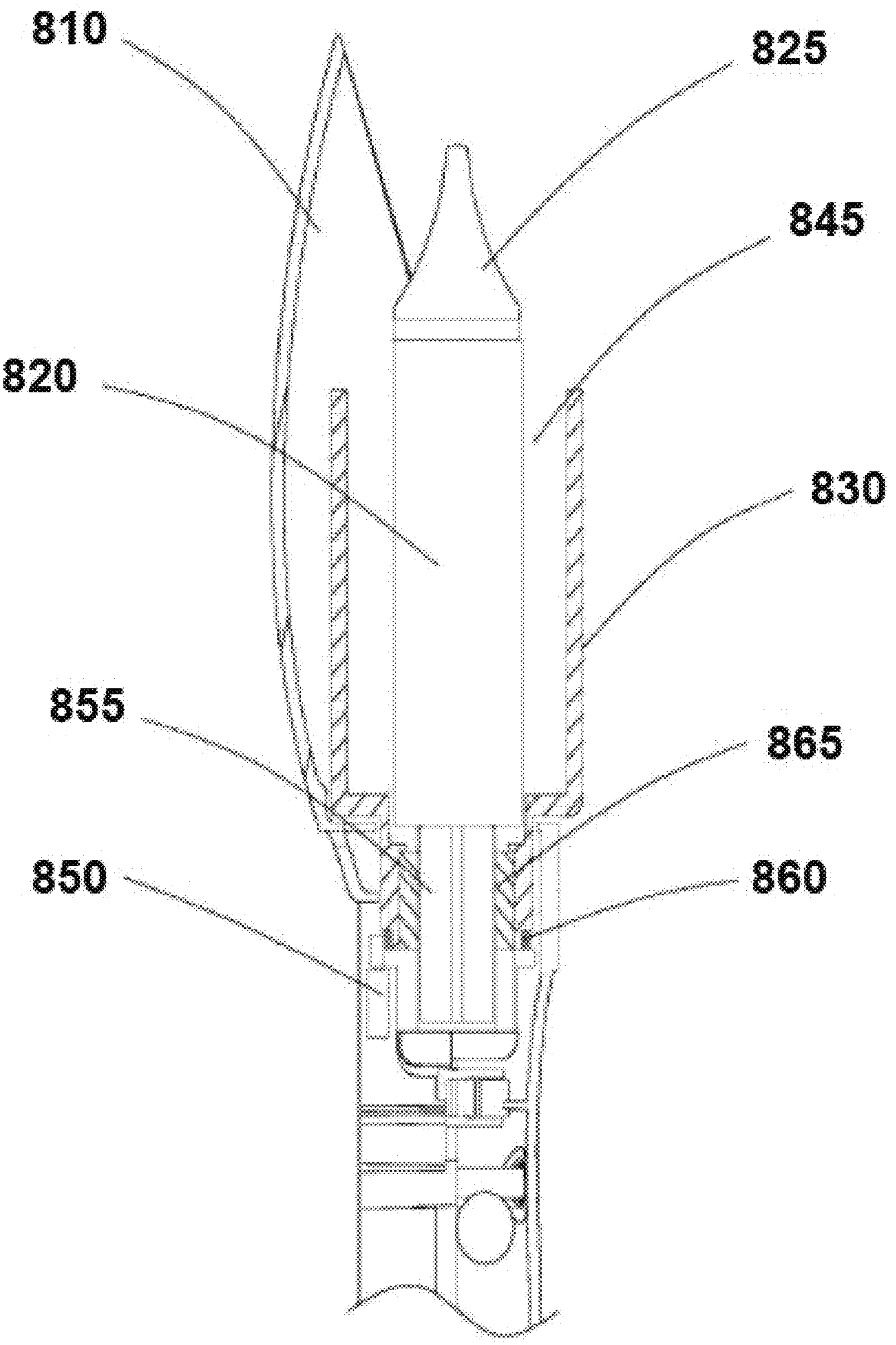
FIG. 12 is a cross-sectional view of a portion of the automatic hair curler of FIG. 11 in accordance with various aspects of the present disclosure.

FIG. 12 shows a cross sectional view of the hair curler shown in FIG. 11. As shown in FIG. 12, a driving device of the hair curler may include a motor 850, the mounting shaft 855, a gear 860 and a bearing 865. The motor 850 may be installed on the handle 805, and the gear 860 may be fixedly connected with the rotating seat 830, where the gear 860 is synchronously coupled with a rotating shaft of the motor 850. In addition, the mounting shaft 855 may be fixed to the handle 805, the heat transmissive cylinder 820 may be fixed at the upper end of the mounting shaft 855, and the rotating seat 830 may be pivoted on the mounting shaft 855 by the bearing 865. In this way, under the drive of the motor 850, the gear 860 starts rotating, and the rotating seat 830 can rotate under the action of the gear 860 and the bearing 865, and the rotating seat 830 can stably rotate relative to the heat transmissive cylinder 820. An electric heating element (not shown) is disposed within the hollow interior the heat transmissive cylinder 820 to warm the transmissive cylinder 820 to a predetermined temperature which can be set by a user via a digital or analog temperature controller (not shown), located on the handle 805, and a printed circuit board (PCB; not shown), located within the handle 805, in electrical communication with the heating element and the temperature controller.

Figure 13:
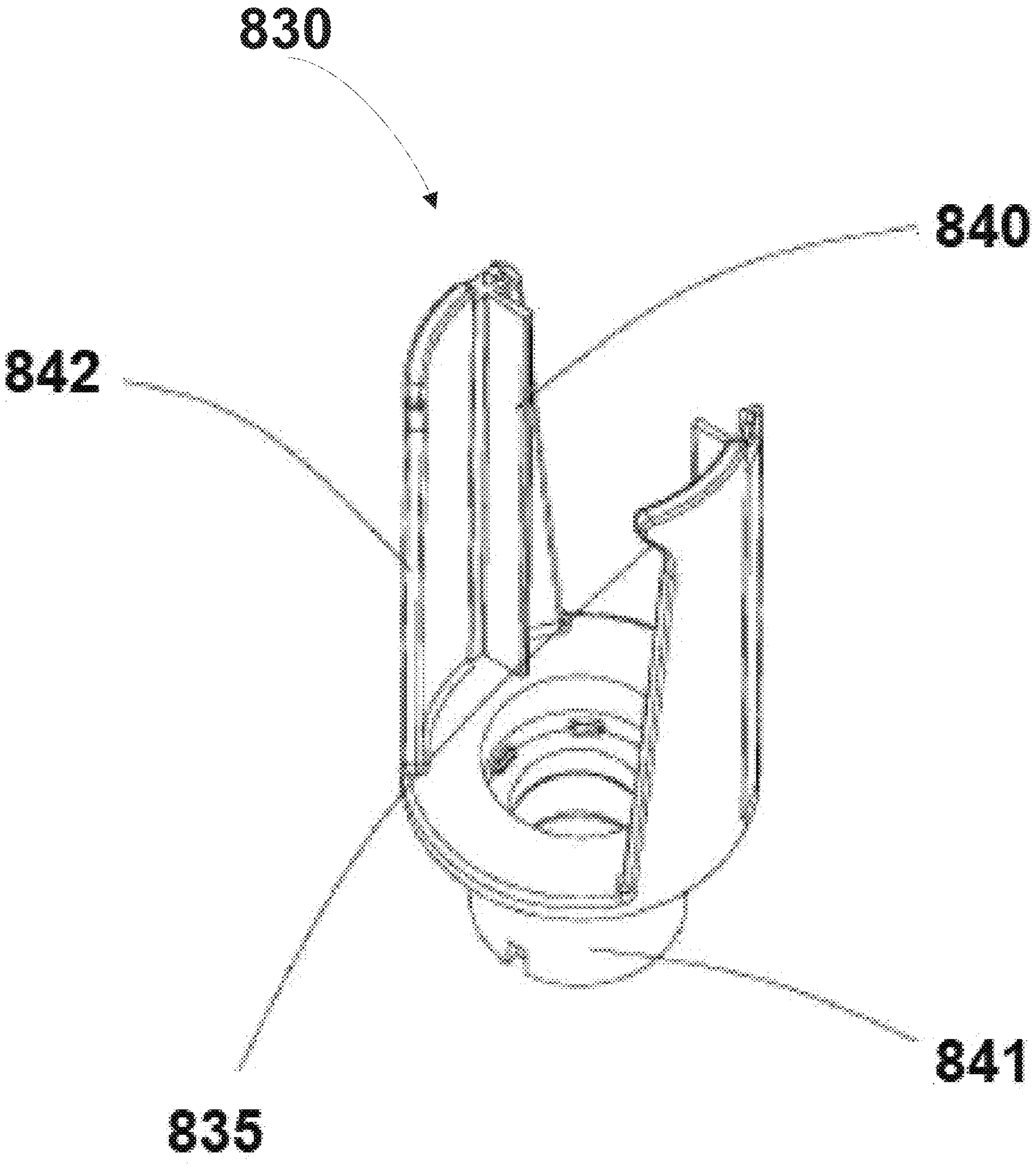
FIG. 13 is a schematic view of a rotating seat of the automatic hair curler of FIG. 11 in accordance with various aspects of the present disclosure.

As shown in FIG. 13, the rotating seat 830 may include a sleeving part 841 and a shifting piece 842, where the shifting piece 842 is distributed on the periphery of the sleeving part 841 and extends outwardly from the sleeving part 841. The sleeving part 841 may be sleeved on an outer ring of the bearing 865 and fixedly connected with the outer ring of the bearing 865. A hair curling cavity 845 can be formed by the inner surface of the shifting piece 842 and the outer surface of the heat transmissive cylinder 820 in cooperation, so the entire structure is more stable.

The shifting piece 842 may extend at least partially around a circumference of sleeving part 841 (such that the shifting piece may extend at least partially around an assembled heat transmissive rod). For example, in the embodiment shown in FIGS. 13 and 14, two shifting pieces 842 may be spaced apart around the circumference of the sleeving part 841, thereby extending less than the entire circumference of the sleeving part 841. In some embodiments, one or more shifting pieces 842 may extend the entire circumference around the sleeving part 841 or less than the entire circumference of the sleeving part 841. Further, the shifting piece 842 may include at least one shifting part 835, where shifting parts 835 may be formed of projections that are convexly arranged as part of a side wall of the shifting piece 842. Shifting parts 835 may help shifting or otherwise maneuvering of hair inserted into the automatic hair curler. Meanwhile, a positioning elastic part 840 may be arranged on an inner wall of the shifting piece 842, so the hair can be wound on the heat transmissive cylinder 820 more smoothly in a hair curling process, and accordingly, the hair curling effect may be better. The positioning elastic part 840 may extend inwardly from the side wall of the shifting piece 842, such that the positioning elastic part 840 may extend into the hair curling cavity 845 formed between the inner surface of the shifting piece 842 and the outer surface of the heat transmissive cylinder 820.

Figure 14:
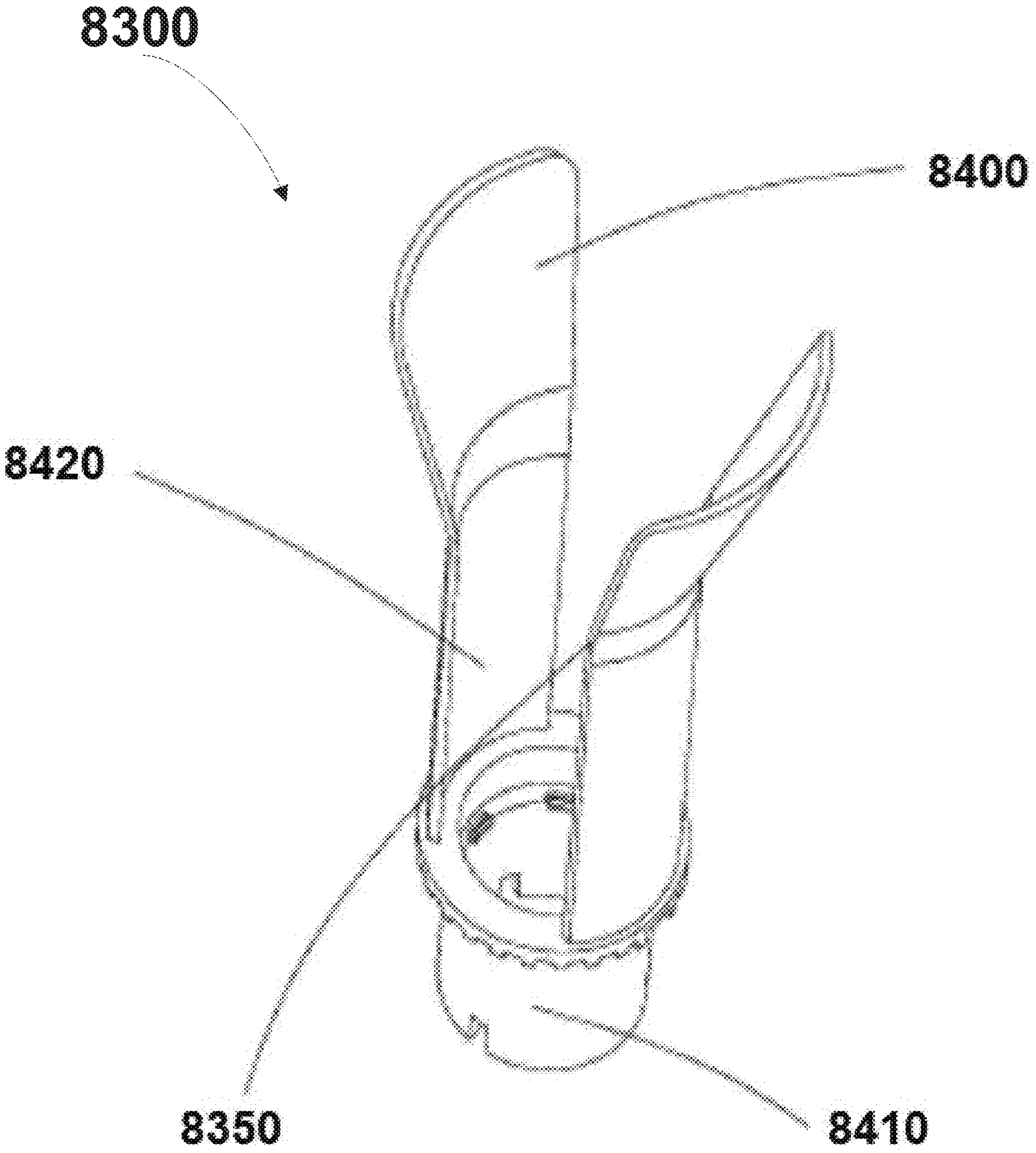
FIG. 14 is a schematic view of an alternative rotating seat of the automatic hair curler of FIG. 11 in accordance with various aspects of the present disclosure.

In some embodiments, a rotating seat 8300 may adopt the structure as shown in FIG. 14, where an elastic piece 8430 may be arranged at an upper end of the shifting piece 8420. The elastic piece 8430 may gradually incline outwards from the upper end of the shifting piece 8420, inclining in a direction from a bottom of the elastic piece 8430 to a top of the elastic piece 8430. The elastic piece 8430 may have certain flexibility, and thus may shake during rotation of the rotating seat 8300 and may also play a certain combing function on the hair, so as achieve the effect of winding the hair on the heat transmissive cylinder 820 more smoothly. The shifting part 8350 may be located at a juncture of the shifting piece 8420 and the elastic piece 8430. The positioning elastic part 840 and the elastic piece 8430 described above may be made of a silica gel material or such elastic materials as rubber blocks or plastic blocks, etc.

According to some embodiments of the present disclosure, an automatic hair curler may include a handle, a heat transmissive rod extending from the handle, a rotating seat extending at least partially around the heat transmissive rod, a hair curling cavity formed between an inner surface of the rotating seat and an outer surface of the heat transmissive rod, a motor installed in the handle, a mounting shaft fixedly connected to the handle, and a gear fixed on the rotating seat and synchronously coupled with a rotating shaft of the motor, wherein the heat transmissive rod is installed at an upper end of the mounting shaft. A sleeving part of the rotating seat may be sleeved around at least a partial axial length of the mounting shaft, such that the sleeving part may be axially retained to the handle of the automatic hair curler and rotatable around the mounting shaft. For example, the hair curler 800 shown in FIG. 12 includes a mounting shaft 855 fixed to the handle and a heat transmissive cylinder 820 fixed to the mounting shaft 855. A rotating seat 830 is disposed around at least a portion of the heat transmissive cylinder 820 and rotatably retained to the handle. Particularly, a sleeving part of the rotating seat 830 may be sleeved around at least a partial axial length of the mounting shaft 855 and rotatable around the mounting shaft 855 by gear 860 when driven by the motor 850. In some embodiments, the diameter of the heat transmissive cylinder 820 may be greater than the diameter of the mounting shaft 855, whereby the diameter of the heat transmissive rod may act to axially retain the sleeving part of the rotating seat 830. In some embodiments, one or more gears 860 may act to axially retain the sleeving part of the rotating seat 830 to the handle.

In some embodiments, such as shown in FIGS. 11 and 12, a bearing 865 may be disposed between a mounting shaft 855 and a sleeving part 841 of a rotating seat 830, where the bearing 865 may be fixed to either the mounting shaft 855 or the sleeving part 841. In some embodiments, an outer surface of a mounting shaft and/or an inner surface of a sleeving part may be coated with a bearing material, such as a reduced friction material, where the coated surface may act as the bearing between the mounting shaft and the sleeving part of a rotating seat.

As shown in FIGS. 11 and 12, the automatic hair curler 800 may further include a cover body 825 installed at a top end of the heat transmissive cylinder 820. An outer surface of the cover body 825 may be an arc surface, which may provide a better guide function for the hair in the hair curling process.

The heat transmissive cylinder 820 of the automatic hair curler 800 includes a coating on the outer surface thereof, the coating comprising volcanic or lava rock and a ceramic ("lava rock coating") as previously described. The heat transmissive cylinder 820 can be made of the same type of materials described for the heat transmissive plates of the flat iron 100 and the lava rock coating can be the same composition and coating thickness as with the flat iron 100. In some instances, the heat transmissive cylinder 820 further includes a protective coating on the lava rock coating also as previously described.

Figure 15:
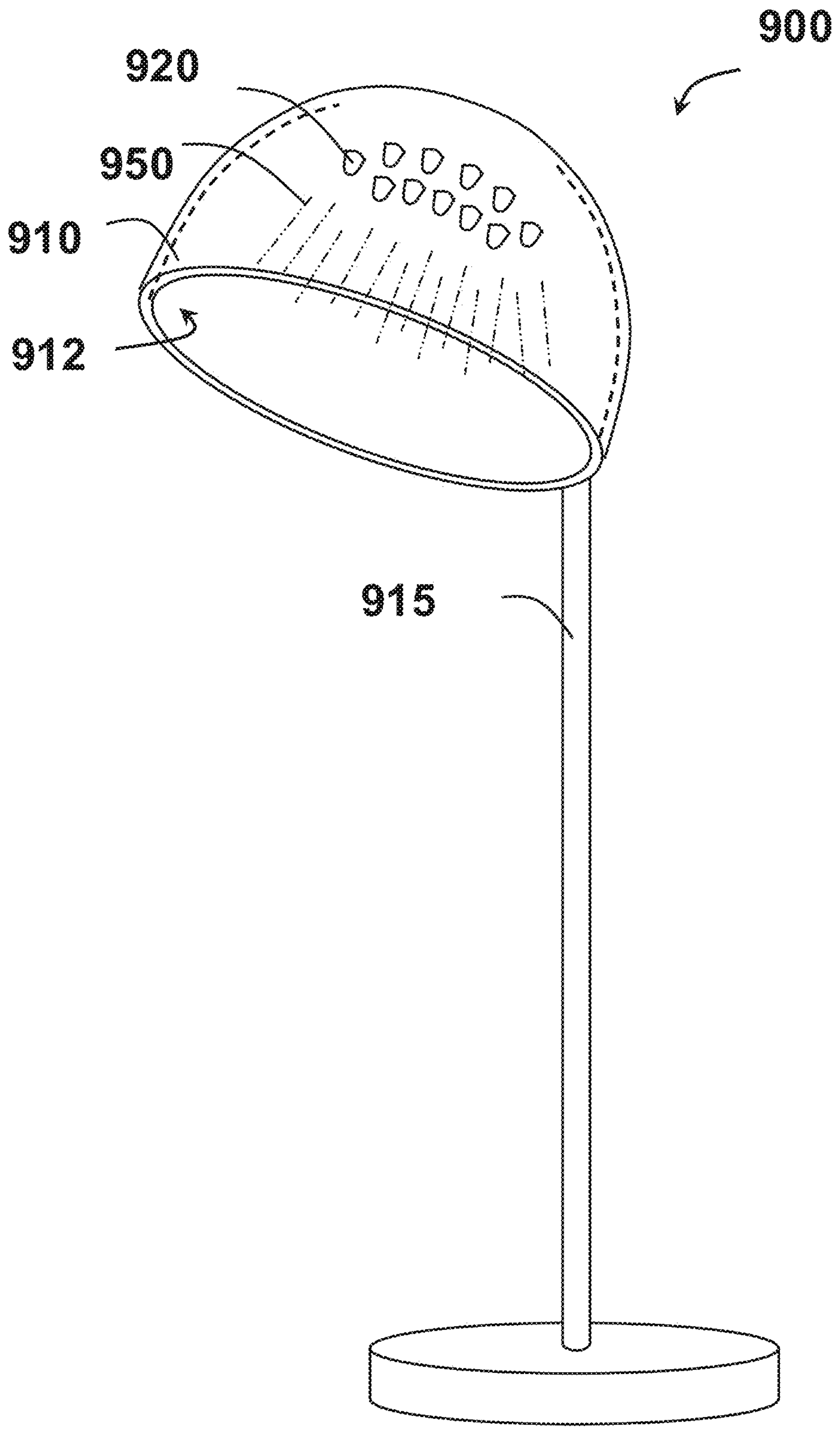
FIG. 15 is a perspective view of another hair dryer according to embodiments of the present disclosure.

Referring now to FIG. 15, an example of another hair dryer 900 according to embodiments of the present disclosure is shown. The hair dryer 900 includes a hood 910 having a plurality of heated air vents 920. The hood 910 may be held on a stand 915 and oriented relative to the stand to project heated air 950 in a selected direction. The stand 915 may be adjustable in height to raise or lower the hood 910 (e.g., to accommodate the height of a user situated under the hood). In some embodiments, a power cord may run along the stand 915 to provide power from an outlet to the heated air vents 920. In some embodiments, a battery power source may be provided in the hair dryer 900 to power the heated air vents 920.

The heated air vents 920 may be provided along an inner surface 912 of hood 910. The heated air vents 920 include a coating on the surface thereof, the coating comprising volcanic or lava rock and a ceramic ("lava rock coating") as previously described. The heated air vents 920 can be made of the same type of materials described for the heat transmissive plates of the flat iron 100 and the lava rock coating can be the same composition and coating thickness as with the flat iron 100. In some instances, the heated air vents 920 further include a protective coating on the lava rock coating also as previously described.

The Examples provided below are merely exemplary and should not be construed as limiting the appended claims in any way. Furthermore, one of ordinary skill in the art will appreciate that certain preparative variables or experimental parameters may be modified without imparting from the scope of the examples or the subject matter described in the present disclosure.

Example 1

Preparation of a Composition

A basalt was ground into a fine powder consisting of basalt granules ranging from 10 nm to 5 μm (microns). A volume of 32.3 grams of the fine powder basalt was added to 1064 grams of a ceramic oil (Dongguan LilaTu Chemical Co., Ltd.) to form a mixture having about 3 wt % basalt and about 97 wt % ceramic oil. The mixture was then mixed at room temperature using a Mixmaster Machine fitted with an impeller at 75-150 rpm for about 2 hours to ensure infusion of the fine powder basalt into the ceramic oil. The mixture was then placed in a cylindrical plastic drum. The drum was sealed and rolled at 200-300 rpm for 12 hours at room temperature. After rolling, the mixture was subjected to gravity filtration through a polyester cloth (350 mesh) to remove undissolved solids, yielding the final basalt-containing ceramic oil.

Example 2

Preparation of Heating Plate from Composition of Example 1

The basalt-containing ceramic oil was applied to a top surface of two aluminum plates by spray coating. A first spray coating was applied and the aluminum plates with the first spray coating were dried at 80° C. for 2 minutes. A second spray coating was then applied followed by drying at 130° C. for 15 minutes and further drying at 250° C. for 1.5 hours After the multistage drying process, the aluminum plates had a basalt-containing ceramic coating having a thickness of about 25-30 μm (microns). Silicon dioxide was then applied to the basalt-containing ceramic coating to form a 5-10 μm (microns) protective coating.

Examples 3-5 below provide data for various tests comparing a hairstyling flat iron having the heating plates of Example 2 (hereinafter "lava rock flat iron") to two commercially available comparative hairstyling flat irons. The first comparative flat iron is a CHI® flat iron having ceramic-coated heating plates heated to a temperature of 200° C. (comparative flat iron #1). The second comparative flat iron is a CHI® flat iron having ceramic-coated heating plates heated to a temperature of 220° C. (CHI® flat iron #2). The results for Examples 3-5 are compiled in Table 1.

Example 3

Comparison of Heat up Time

In Example 3, the stable temperature of the heating plates of each flat iron was measured after a 30 minute heat up cycle. The heating plates were at room temperature at the beginning of each test. The average amount of time required for the heating plates of each iron to reach a temperature equivalent to 90% of the stable temperature was also measured.

The lava rock flat iron attained an average stable temperature of 197° C. The lava rock flat iron required an average of 23 seconds to reach a temperature equivalent to 90% of the maximum stable temperature.

Comparative flat iron #1 also attained an average stable temperature of 197° C. Comparative flat iron #1 required an average of 31 seconds to reach a temperature equivalent to 90% of the maximum stable temperature.

Comparative flat iron #2 attained an average stable temperature of 220° C. Comparative flat iron #2 required an average of 32 seconds to reach a temperature equivalent to 90% of the maximum stable temperature.

The above data indicates that the lava rock flat iron according to the present disclosure reaches average stable temperatures competitive with commercially available flat irons and reaches temperature equivalent to 90% of the stable temperature in 8 to 9 less seconds. Accordingly, the lava rock flat iron heats to 90% of the stable temperature at a rate 26-28% faster than other commercially available flat irons.

Example 4

Comparison of Temperature Reduction

In Example 4, the temperature reduction of each flat iron was evaluated by pressing the heating plates of the flat iron on a damp towel and pulling the damp towel therefrom. After the pressing and pulling had been performed twenty (20) times, the temperature of the flat iron was measured. For simplicity, this test is referred to below as the damp towel test.

The lava rock flat iron had an average temperature of 197° C. prior to beginning the damp towel test. After the damp towel test, the measured average temperature of the lava rock flat iron was 140° C., constituting an average temperature reduction of 29%.

Comparative flat iron #1 had an average temperature of 197° C. prior to beginning the damp towel test. After the damp towel test, the measured average temperature of comparative flat iron #1 was 114° C., constituting an average temperature reduction of 42%.

Comparative flat iron #1 had an average temperature of 220° C. prior to beginning the damp towel test. After the damp towel test, the measured average temperature of comparative flat iron #1 was 113° C., constituting an average temperature reduction of 49%.

As can be seen, the lava rock flat iron is substantially more effective at retaining heat than other commercially available flat irons.

Example 5

Comparison of Heat up Time after Temperature Reduction

In Example 5, the amount of time required for each hairstyling flat iron to reach its stable temperature (Example 3) from temperature at the end of the damp towel test (Example 4) was measured.

The lava rock flat iron required an average of 9 seconds to reach its stable temperature from temperature at the end of the damp towel test. Comparative flat iron #1 required an average of 13 seconds to reach its stable temperature from temperature at the end of the damp towel test. Comparative flat iron #2 required an average of 12 seconds to reach its stable temperature from temperature at the end of the damp towel test.

From the above, it is shown that not only does the lava rock flat iron retain heat better than other commercially available flat irons but also reheats 25-31% faster than other commercially available flat irons during use.

TABLE 1

Compilation of Data from Examples 3-5.

| | Lava Rock Flat Iron | | | Comparative Flat Iron #1 (Temp. 200° C.) | | Comparative Flat Iron #2 (Temp. 220° C.) | | |
|---|---|---|---|---|---|---|---|---|
| Trial | 1 | 2 | 3 | 1 | 2 | 1 | 2 | 3 |
| Stable temp. (° C.) after 30 min heat cycle | 203 | 195 | 194 | 198 | 196 | 221 | 218 | 220 |
| Average Temp. (° C.) | | 197 | | 197 | | | 220 | |
| Time (s) to reach 90% of stable temp. | 23 | 22 | 23 | 31 | 30 | 33 | 29 | 33 |
| Average Time (s) | | 23 | | 31 | | | 32 | |
| Temp (° C.) after damp towel test | 135 | 145 | 140 | 112 | 115 | 112 | 109 | 118 |
| ΔT (% loss) | 68 (33%) | 50 (26%) | 54 (28%) | 86 (43%) | 81 (41%) | 109 (49%) | 109 (50%) | 102 (46%) |
| Average temp. after damp towel test | | 140 | | 114 | | | 113 | |
| Average ΔT (% loss) | | 57 (29%) | | 84 (42%) | | | 107 (49%) | |
| Recovery Time (s) to stable temp. | 9 | 8 | 9 | 13 | 12 | 11 | 13 | 13 |
| Average Recovery Time (s) | | 9 | | 13 | | | 12 | |

Example 6

Ions Produced by Coating According to a Flat Iron Embodiment

In Example 6, using an air ion counter (DLY-3), a lava rock flat iron produced according to Examples 1-2 and a comparative flat iron (produced according to Examples 1-2 but without the addition of the fine powder basalt to the ceramic oil as described in Example 1) were evaluated to determine the amount of ions (ion density, the number of ions per cubic centimeter in air) produced during the use of each iron. At an operating temperature (that is, the surface temperature of the heat transmissive plates of the flat iron) of 410° F. (210° C.), the comparative flat iron was found to produce an ion density of 24,100 ions/cm$^3$. The lava rock flat iron produced according to Example 2, on the other hand, was found to produce an ion density of 38,100 ions/cm$^3$ at the same operating temperature. The use of a lava rock-containing ceramic coating on the heat transmissive plates of a flat iron therefore resulted in about a 58% increase in ion production, as compared to a flat iron contained having a ceramic coating without lava rock incorporated therein. Increased ion generation has been found to enhance the quality of a user's hair after use of an iron. Specifically, increased ion density of a hair styling device has been found to result in smoother, shinier, and less frizzy hair.

Example 7

Ions Produced by Coating According to a Hair Dryer Embodiment

In Example 7, using an air ion counter (COM-3010PRO; COM SYSTEM, INC., Tokyo, Japan), two hair dryers were evaluated to determine the number of ions (ion density, the number of ions per cubic centimeter in air) produced during the use of each. Each of the hair dryers were structurally as described in FIGS. 5-8A with a honeycomb ceramic PTC heater. The first, comparative, hair dryer utilized a honeycomb ceramic PTC heater without a ceramic coating. The second hair dryer, a hair dryer according to an embodiment of the present disclosure (a "lava rock hair dryer"), the honeycomb ceramic PTC heater was formed with a lava-rock containing ceramic coating, using the composition formed in Example 1 coated on both sides of the honeycomb ceramic PTC heater, using a spray coating method substantially as described in Example 2.

Under the highest blow-drying speed and heat temperatures settings of the dryer and over a 10 second test interval (distance between ion counter and hair dryer air exit equal to two centimeters), the comparative hair dryer was found to produce an ion density of 158 ions/$cm^3$. The lava rock hair dryer, on the other hand, was found to produce an ion density of 768 ions/$cm^3$ under the same operating conditions. The use of a lava rock-containing ceramic coating on the honeycomb ceramic PTC heater of a hair dryer therefore resulted in about a 386% increase in ion production, as compared to a hair dryer contained having an uncoated honeycomb ceramic PTC heater.

Example 8

Hardness of Coating According to One Embodiment

In Example 8, the hardness of coatings on heat transmissive cylinders for use curling irons (for example, curling iron 700) were evaluated using a pencil hardness test (for an exemplary pencil hardness test, see ASTM D 3363, Mar. 10, 2000). To a first cylinder, a basalt-containing ceramic oil (Example 1) was applied to the external surface of the cylinder by spray coating and dried at 250° C. for one hour, yielding a lava rock-containing ceramic coating having a thickness of 20-30 micrometers (μm). To a second cylinder, a ceramic oil, without lava rock added, was applied to the external surface of the cylinder by spray coating and dried at 250° C. for one hour, yielding a ceramic coating also having a thickness of 20-30 micrometers (μm). The ceramic coating on the second cylinder was found to reach a pencil hardness of 5H. The ceramic coating on the second cylinder was damaged when a pencil hardness of 6H was used. The lava rock-containing ceramic coating on the first cylinder, on the other hand, was found to be unaffected when tested with a 6H pencil. The data of Example 8 shows that the addition of lava rock to ceramic oil compositions results in coatings having enhanced durability.

STATEMENTS OF THE DISCLOSURE

Statements of the Disclosure include:

Statement 1: A heatable hair styling device, the device comprising a heat transmissive member; and a composite coating disposed on a surface of the heat transmissive member, the coating having ceramic and lava rock incorporated therein.

Statement 2: A heatable hair styling device according to Statement 1, wherein the lava rock is selected from the group consisting of komatiite, picrite basalt, basalt, basaltic andesite, andesite, dacite, rhyolite, nephelinite, melilitite, tephrite, basanite, trachybasalt, basaltic trachyandesite, trachyandesite, trachite, trachydacite, phonotephrite, tephriphonolite, phonolite, scoria, tuff, latite, pumice, and ignimbrite.

Statement 3: A heatable hair styling device according to Statement 1 or 2, wherein the lava rock is in the form of particulates, the particulates having diameters ranging from about 10 nm to about 25 μm.

Statement 4: A heatable hair styling device according to any one of Statements 1-3, wherein the composite coating has a thickness ranging from about 5 μm to about 100 μm.

Statement 5: A heatable hair styling device according to any one of Statements 1-4, further comprising a protective coating disposed on the composite coating.

Statement 6: A heatable hair styling device according to Statement 5, wherein the protective coating has a thickness ranging from about 100 nm to about 50 μm.

Statement 7: A heatable hair styling device according to any one of Statements 1-6, wherein the heat transmissive member is in the shape of a plate.

Statement 8: A heatable hair styling device according to any one of Statements 1-6, wherein the heat transmissive member is in the shape of a cylinder.

Statement 9: A heatable hair styling device according to Statement 8, wherein the cylindrical shape is frustoconical.

Statement 10: A heatable hair styling device according to any one of Statements 1-6, wherein the heat transmissive member is a positive temperature coefficient (PTC) heating element.

Statement 11: A heatable hair styling device according to Statement 10, wherein the PTC heating element is a honeycomb PTC heating element.

Statement 12: A heatable hair styling device according to Statement 10, wherein the PTC heating element is a mesh PTC heating element.

Statement 13: A heatable hair styling device according to Statement 10, wherein the PTC heating element is a corrugated fin PTC heating element.

Statement 14: A heatable hair styling device according to Statement 10, wherein the PTC heating element is a cylindrical PTC heating element.

Statement 15: A hair dryer, the hair dryer comprising an air inlet; a motor; a blade assembly; a heated air outlet; and a heat transmissive member, the heat transmissive member having a composite coating on a surface thereof, the composite coating having ceramic and lava rock incorporated therein.

Statement 16: A hair dryer according to Statement 15, wherein the heat transmissive member is a positive temperature coefficient (PTC) heating element.

Statement 17: A hair dryer according to Statement 16, wherein the PTC heating element comprises a first surface facing the air inlet; a second surface facing the heated air outlet; and a plurality of apertures extending through the first surface and the second surface, wherein the composite coating is disposed on at least one of the first surface and the second surface.

Statement 18: A hair dryer according to Statement 17, wherein the composite coating is disposed on both the first surface and the second surface.

Statement 19: A hair dryer according to any one of Statements 16-18, wherein the PTC heating element is a honeycomb PTC heating element.

Statement 20: A hair dryer according to any one of Statements 16-18, wherein the PTC heating element is a mesh PTC heating element.

Statement 21: A hair dryer according to any one of Statements 16-18, wherein the PTC heating element is a corrugated fin PTC heating element.

Statement 22: A hair dryer according to Statement 16, wherein the PTC heating element is a cylindrical PTC heating element.

Statement 23: A hair dryer according to any one of Statements 15-22, wherein the lava rock is selected from the group consisting of komatiite, picrite basalt, basalt, basaltic andesite, andesite, dacite, rhyolite, nephelinite, melilitite, tephrite, basanite, trachybasalt, basaltic trachyandesite, trachyandesite, trachite, trachydacite, phonotephrite, tephriphonolite, phonolite, scoria, tuff, latite, pumice, and ignimbrite.

Statement 24: A hair dryer according to any one of Statements 15-23, wherein the lava rock is in the form of particulates, the particulates having diameters ranging from about 10 nm to about 25 μm.

Statement 25: A hair dryer according to any one of Statements 15-24, wherein the composite coating has a thickness ranging from about 5 μm to about 100 μm.

Statement 26: A hair dryer according to any one of Statements 15-25, further comprising a protective coating disposed on the composite coating.

Statement 27: A hair dryer according to any one of Statement 26, wherein the protective coating has a thickness ranging from about 100 nm to about 50 μm.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A heatable hair styling device, the device comprising:

a handle portion;

a styling portion coupled with the handle portion and comprising a heat transmissive member, the heat transmissive member having a cylindrical shape; and a composite coating disposed on a surface of the heat transmissive member, the coating having ceramic and lava rock incorporated therein, wherein the composite coating exhibits a pencil hardness of 6H according to an ASTM D 3363 pencil hardness test, and the device produces 38,100 ions/$cm^3$ at an operating temperature of 410° F.

2. The device of claim 1, wherein the lava rock is selected from the group consisting of komatiite, picrite basalt, basalt, basaltic andesite, andesite, dacite, rhyolite, nephelinite, melilitite, tephrite, basanite, trachybasalt, basaltic trachyandesite, trachyandesite, trachite, trachydacite, phonotephrite, tephriphonolite, phonolite, scoria, tuff, latite, pumice, and ignimbrite.

3. The device of claim 1, wherein the lava rock is in the form of particulates, the particulates having diameters ranging from about 10 nm to about 25 μm.

4. The device of claim 1, wherein the composite coating has a thickness ranging from about 5 μm to about 100 μm.

5. The device of claim 1, further comprising a protective coating disposed on the composite coating, the protective coating made of silicon dioxide, titanium dioxide or aluminum oxide and having a thickness ranging from about 100 nm to about 50 μm.

6. The device of claim 1, wherein the cylindrical shape of the heat transmissive member is frustoconical.

7. The device of claim 1, wherein the heat transmissive member is a positive temperature coefficient (PTC) heating element.

8. The device of claim 1, wherein the lava rock is basalt.

9. The device of claim 8, wherein the basalt is in the form of particulates, the particulates having diameters ranging from about 10 nm to about 5 μm.

10. The device of claim 1, wherein the ceramic is selected from the group consisting of silicon carbide, aluminum nitride, silicon nitride, aluminum oxide, beryllium oxide, boron nitride (BN), and titanium oxide.

11. The device of claim 1, wherein the composite coating consists of a resin, the ceramic and the lava rock.

12. The device of claim 1, wherein about 1 to about 15 wt % of the composite coating is the lava rock.

13. The device of claim 1, wherein about 2 to about 5 wt % of the composite coating is the lava rock.

14. The device of claim 1, wherein the composite coating further comprises one or more of a pigment, a filler and tourmaline.

15. The device of claim 1, wherein the lava rock is in the form of particulates, the particulates having diameters ranging from 10 nm to 5 μm.

16. The device of claim 1, wherein the composite coating heats from room temperature to about 197° C. in about 23 seconds.

17. A heatable hair styling device, the device comprising:

a handle portion;

a styling portion coupled with the handle portion and comprising a heat transmissive member, the heat transmissive member having a cylindrical shape; and a composite coating disposed on a surface of the heat transmissive member, the coating having ceramic and lava rock incorporated therein, wherein the device produces 38,100 ions/$cm^3$ at an operating temperature of 410° F.

18. The device of claim 17, wherein the cylindrical shape of the heat transmissive member is frustoconical.

19. A heatable hair styling device, the device comprising:

a handle portion;

a styling portion coupled with the handle portion and comprising a heat transmissive member, the heat transmissive member having a cylindrical shape; and a composite coating disposed on a surface of the heat transmissive member, the coating having ceramic and lava rock incorporated therein, wherein the composite coating heats from room temperature to about 197° C. in about 23 seconds.

20. The device of claim 19, wherein the cylindrical shape of the heat transmissive member is frustoconical.

* * * * *